United States Patent
Sako et al.

(10) Patent No.: US 8,294,776 B2
(45) Date of Patent: Oct. 23, 2012

(54) IMAGING APPARATUS AND IMAGING METHOD

(75) Inventors: Yoichiro Sako, Tokyo (JP); Masaaki Tsuruta, Tokyo (JP); Taiji Ito, Kanagawa (JP); Masamichi Asukai, Kanagawa (JP)

(73) Assignee: Sony Corporation, Tokyo (JP)

( * ) Notice: Subject to any disclaimer, the term of this patent is extended or adjusted under 35 U.S.C. 154(b) by 569 days.

(21) Appl. No.: 11/856,396

(22) Filed: Sep. 17, 2007

(65) Prior Publication Data

US 2008/0211921 A1  Sep. 4, 2008

(30) Foreign Application Priority Data

Sep. 27, 2006 (JP) .................................. 2006-261977

(51) Int. Cl.
*H04N 5/228* (2006.01)

(52) U.S. Cl. .................................... 348/222.1

(58) Field of Classification Search ................. 348/207.1
See application file for complete search history.

(56) References Cited

U.S. PATENT DOCUMENTS

| | | | | |
|---|---|---|---|---|
| 6,115,482 A * | 9/2000 | Sears et al. | ..................... | 382/114 |
| 6,307,526 B1 * | 10/2001 | Mann | ................................. | 345/8 |
| 6,985,172 B1 * | 1/2006 | Rigney et al. | ................. | 348/149 |
| 7,164,438 B2 * | 1/2007 | Kindaichi | .................. | 348/207.1 |
| 7,542,080 B2 * | 6/2009 | Kato et al. | .................... | 348/234 |
| 7,616,877 B2 * | 11/2009 | Zarnowski et al. | ............. | 396/85 |
| 2003/0081121 A1 * | 5/2003 | Kirmuss | ....................... | 348/143 |
| 2006/0007314 A1 * | 1/2006 | Fong | ......................... | 348/207.99 |
| 2006/0221266 A1 * | 10/2006 | Kato et al. | ..................... | 348/838 |
| 2009/0322654 A1 * | 12/2009 | Kato et al. | ......................... | 345/8 |

FOREIGN PATENT DOCUMENTS

| | | |
|---|---|---|
| CN | 1156248 C | 7/2004 |
| CN | 2790212 Y | 6/2006 |
| JP | 05-142991 | 6/1993 |
| JP | 5-333891 | 12/1993 |
| JP | 6-70327 A | 3/1994 |
| JP | 6-217188 A | 8/1994 |
| JP | 7-288754 A | 10/1995 |
| JP | 11-164186 A | 6/1999 |
| JP | 11-275425 | 10/1999 |
| JP | 11-338971 | 12/1999 |
| JP | 2001-148843 | 5/2001 |
| JP | 2001-215404 A | 8/2001 |
| JP | 2001-281520 | 10/2001 |
| JP | 2003-23554 A | 1/2003 |
| JP | 2004-186901 | 7/2004 |
| JP | 2004-221869 | 8/2004 |

(Continued)

OTHER PUBLICATIONS

U.S. Appl. No. 12/438,735, filed Feb. 25, 2009, Sako, et al.

(Continued)

*Primary Examiner* — Lin Ye
*Assistant Examiner* — Amy Hsu
(74) *Attorney, Agent, or Firm* — Oblon, Spivak, McClelland, Maier & Neustadt, L.L.P.

(57) ABSTRACT

Disclosed herein is an imaging apparatus including imaging means confitured to photograph an image of a scene that is in a direction in which a user sees, outside world information acquisition means confitured to acquire outside world information, and control means confitured to control an operation of the imaging means based on the outside world information acquired by the outside world information acquisition means.

40 Claims, 23 Drawing Sheets

FOREIGN PATENT DOCUMENTS

| | | |
|---|---|---|
| JP | 2004-248312 | 9/2004 |
| JP | 2005-099163 | 4/2005 |
| JP | 2005-172851 | 6/2005 |
| JP | 2005-181378 | 7/2005 |
| JP | 2005-202801 A | 7/2005 |
| JP | 2005-215373 | 8/2005 |
| JP | 2005-223752 A | 8/2005 |
| JP | 2005-266520 A | 9/2005 |
| JP | 2005-303734 A | 10/2005 |
| JP | 2005-328168 | 11/2005 |
| JP | 2006-208997 A | 8/2006 |
| JP | 2006-217520 A | 8/2006 |
| JP | 2006-237803 | 9/2006 |
| JP | 2006-237961 | 9/2006 |

OTHER PUBLICATIONS

U.S. Appl. No. 12/440,591, filed Mar. 10, 2009, Sako, et al.

Japanese Office Action issued on Mar. 29, 2011 in corresponding Japanese Application No. 2006-261977.

Japanese Office Action mailed on Feb. 21, 2012 in the counterpart Japanese application 2006-261977 filed on Sep. 27, 2006.

People's Republic of China Office Action with English translation dated Dec. 26, 2008 in corresponding application CN 200710161604.4.

* cited by examiner

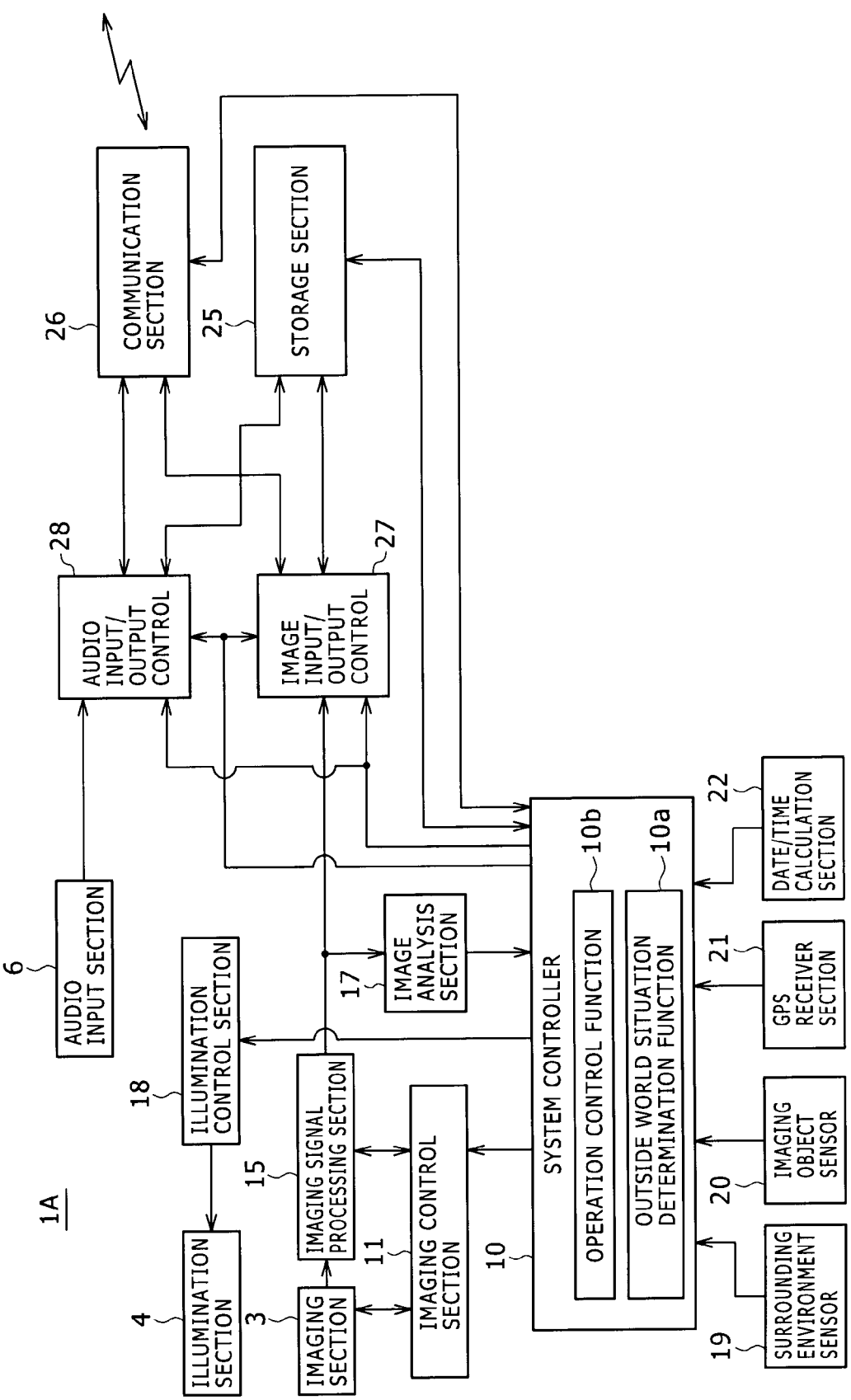

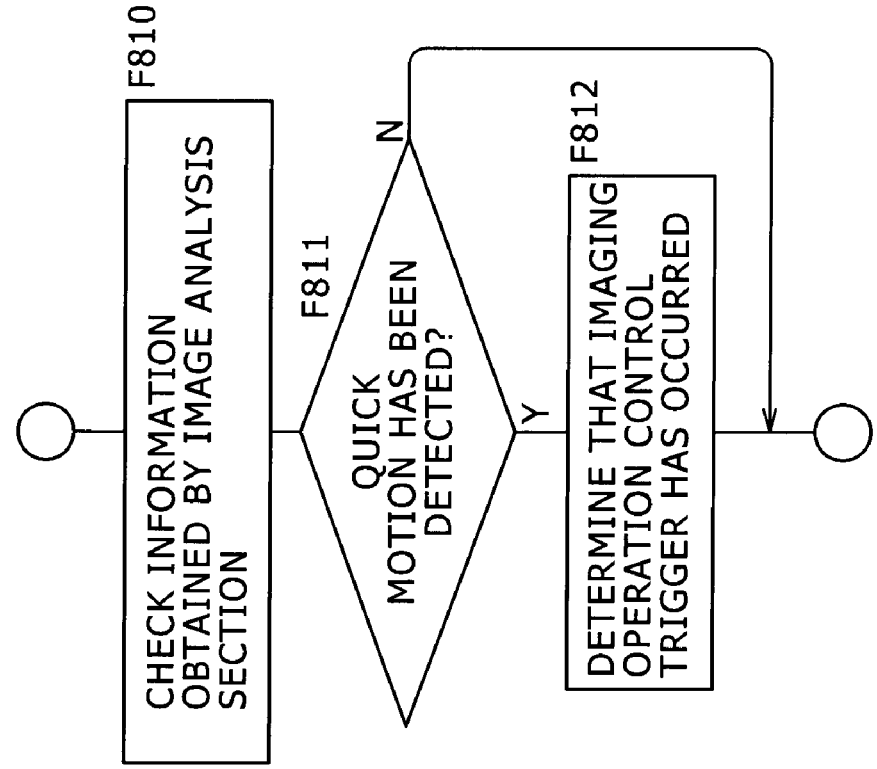
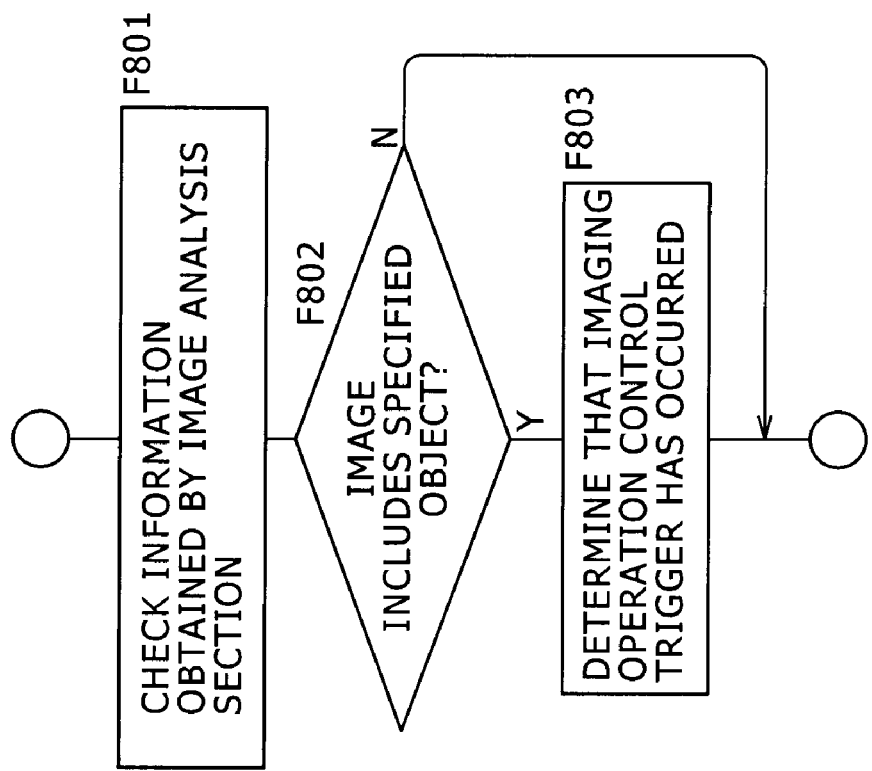

IMAGING APPARATUS AND IMAGING METHOD

CROSS REFERENCES TO RELATED APPLICATIONS

The present invention contains subject matter related to Japanese Patent Application JP 2006-261977, filed in the Japan Patent Office on Sep. 27, 2006, the entire contents of which being incorporated herein by reference.

BACKGROUND OF THE INVENTION

1. Field of the Invention

The present invention relates to an imaging apparatus for photographing a scene that is in a direction in which a user sees while the imaging apparatus is worn by the user using, for example, a spectacle-shaped or head-worn wearing unit. The present invention also relates to an imaging method.

2. Description of the Related Art

There has been proposed an apparatus that has a spectacle-shaped or head-worn wearing unit to which a small camera is attached so as to be able to photograph a scene to which eyes of a user is directed (see, for example, Japanese Patent Laid-open No. 2005-172851).

SUMMARY OF THE INVENTION

However, no known apparatuses are capable of photographing a scene that the user is viewing appropriately in various imaging operation modes in accordance with the situation without the need for the user to operate an operation unit, such as an operation key.

As such, the present invention has been devised to enable appropriate control of an imaging operation to be performed based on outside world information obtained in accordance with various outside world situations.

According to an embodiment of the present invention, there is provided an imaging apparatus including, an imaging section configured to photograph an image of a scene that is in a direction in which a user sees, an outside world information acquisition section configured to acquire outside world information, and a control section configured to control an operation of said imaging section based on the outside world information acquired by said outside world information acquisition section.

According to another embodiment of the present invention, there is provided an imaging method employed by an imaging apparatus that includes an imaging section configured to photograph an image of a scene that is in a direction in which a user sees, the method including the steps of, acquiring outside world information, and controlling an operation of the imaging section based on the outside world information acquired in said acquiring.

According to the present invention, the scene that is in the direction in which the eyes of the user are directed is photographed by the imaging section, and at this time, the imaging operation is controlled based on the outside world information, and thus, the imaging operation is performed appropriately without the need for the user to perform any operation. Accordingly, the scene that is in the direction in which the eyes of the user are directed can be photographed with appropriate timing or in an appropriate mode. In addition, the data of the photographed image can be stored in the storage medium or transmitted to the external device. This enables a scene within the field of vision of a certain user to be shared by a plurality of people, and also enables the scene within the field of vision of the user to be reproduced for viewing subsequently.

BRIEF DESCRIPTION OF THE DRAWINGS

FIG. 4 is a block diagram of the other imaging apparatus according to one embodiment of the present invention;

FIGS. 15 to 22B are flowcharts illustrating procedures for determining occurrence of an imaging operation control trigger according to one embodiment of the present invention.

DETAILED DESCRIPTION OF THE PREFERRED EMBODIMENTS

Hereinafter, imaging apparatuses and an imaging method according to embodiments of the present invention will be described in the following order.

Figure 1:
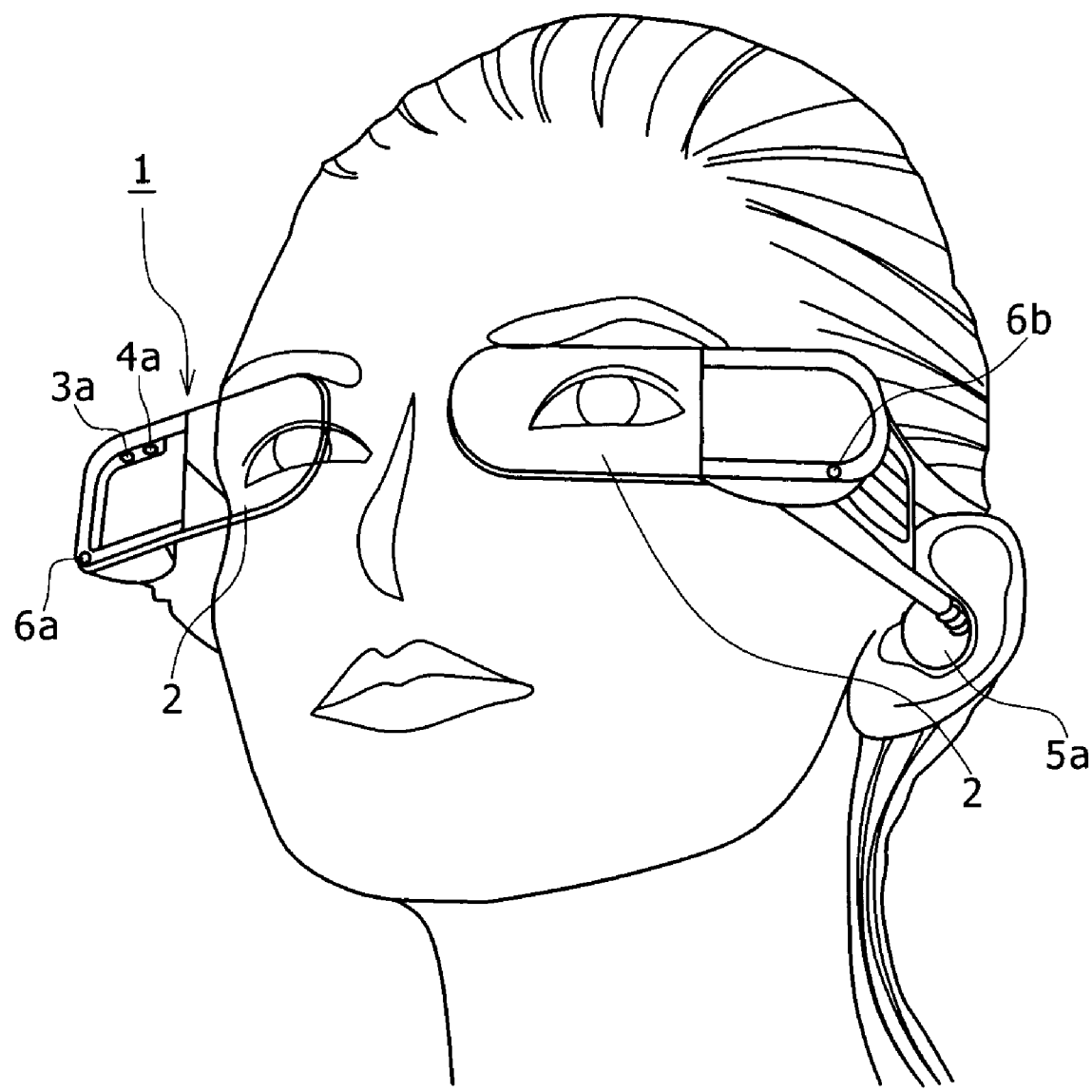
FIG. 1 illustrates an exemplary appearance of an imaging apparatus according to one embodiment of the present invention.

1. Exemplary appearance of imaging apparatus
2. Exemplary structures of imaging apparatus
3. Exemplary photographed images
4. Detection of outside world information
5. Various exemplary operations
6. Effects of embodiments, exemplary variants, and exemplary expansions 1. Exemplary Appearance of Imaging Apparatus FIG. 1 shows an exemplary appearance of an imaging apparatus 1, which is a spectacle-shaped display camera, according to one embodiment of the present invention. The imaging apparatus 1 has a wearing unit having a frame structure that extends halfway around a head from both temporal regions to an occipital region, for example, and is worn by a user with the wearing unit placed over ears as illustrated in this figure.

The imaging apparatus 1 has a pair of display sections 2 designed for left and right eyes, and the display sections 2 are arranged in front of the eyes of the user (i.e., at positions where lenses of common spectacles would be located) when the imaging apparatus 1 is worn by the user in a manner as illustrated in FIG. 1. Liquid crystal panels, for example, are used for the display sections 2, and the display sections 2 are capable of entering a see-through state, i.e., a transparent or translucent state, as illustrated in this figure by transmissivity control. The capability of the display sections 2 to enter the see-through state allows the user to wear the imaging apparatus 1 at all times as he or she wears spectacles, with no interference occurring in his or her daily life.

In addition, the imaging apparatus 1 has a photographic lens 3a arranged to face forward so as to photograph a scene that is in a direction in which the user sees while the imaging apparatus 1 is worn by the user.

In addition, the imaging apparatus 1 has a lighting section 4a that provides illumination in a direction of photographing by the photographic lens 3a. The lighting section 4a is formed by a light emitting diode (LED), for example.

In addition, the imaging apparatus 1 has a pair of earphone speakers 5a that can be inserted into right and left earholes of the user when the imaging apparatus 1 is worn by the user. Note that only the left earphone speaker 5a is shown in the figure.

In addition, the imaging apparatus 1 has microphones 6a and 6b for collecting external sounds, and the microphones 6a and 6b are arranged to the right of the right display section 2 and to the left of the left display section 2, respectively.

Note that FIG. 1 only shows one example, and that various structures are possible for the user to wear the imaging apparatus 1. In general, a requirement for the wearing unit is that it be in the shape of spectacles or of a head-worn type. At least, a requirement for the present embodiment is that the display sections 2 be arranged in front of and close to the eyes of the user, and that the direction in which the photographic lens 3a photographs is a direction in which the eyes of the user are directed, i.e., in a forward direction. Also note that, instead of having the pair of display sections 2 provided for both eyes, the imaging apparatus 1 may have only one of the display sections 2 provided for one eye.

Also note that the imaging apparatus 1 need not have the left and right stereo speakers 5a, but may have only one of the earphone speakers 5a to be inserted into only one earhole. Also note that the number of microphones may be one. That is, the imaging apparatus 1 may have only one of the microphones 6a and 6b. Also note that the imaging apparatus 1 need not have any microphone or earphone speaker.

Also note that the imaging apparatus 1 need not have the lighting section 4a.

In the imaging apparatus 1 illustrated in FIG. 1, a component for photographing and the display sections 2 for monitoring a photographed image are integrated in one unit. On the other hand, an imaging apparatus 1A illustrated in FIG. 2 does not include the display sections 2, but a separate display apparatus is used instead.

Figure 2:
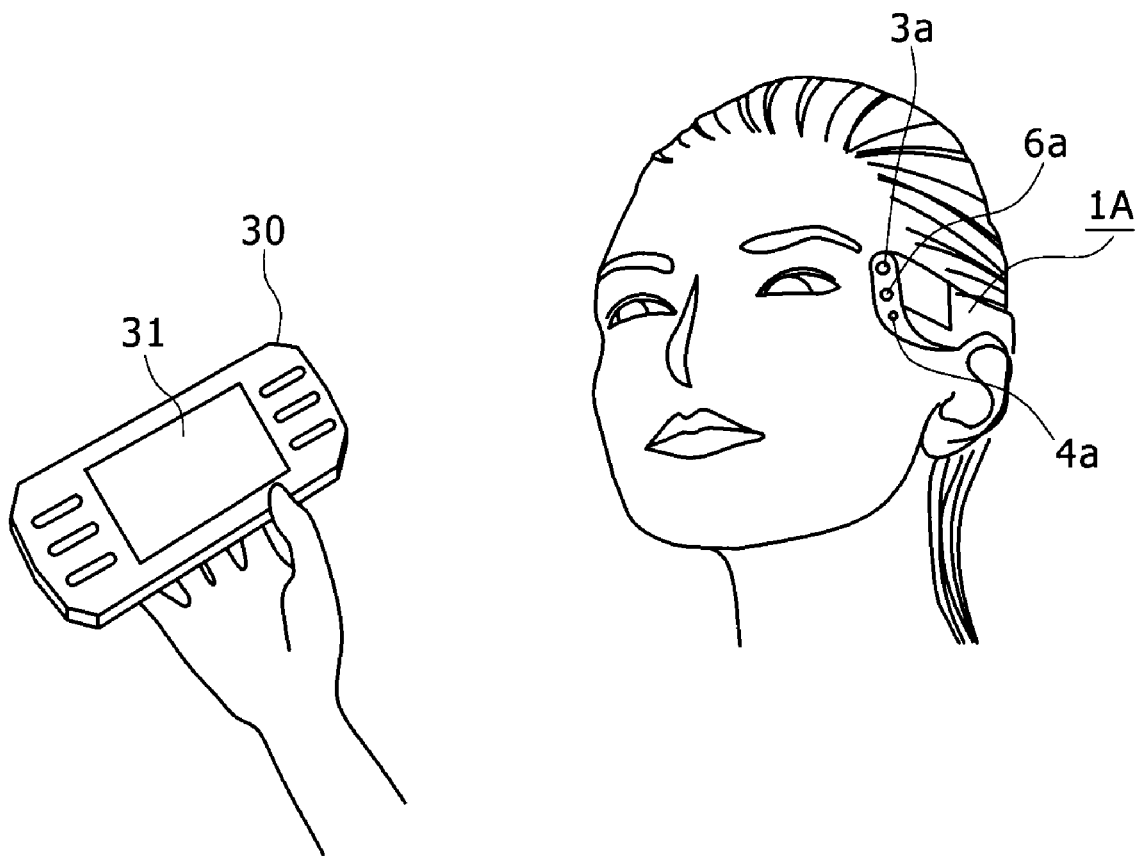
FIG. 2 illustrates an exemplary appearance of another imaging apparatus according to one embodiment of the present invention.

The imaging apparatus 1A illustrated in FIG. 2 is worn on a head using a predetermined wearing frame. The photographic lens 3a is arranged to face forward so as to photograph a scene that is in the direction in which the user sees while the imaging apparatus 1A is worn by the user.

In addition, the imaging apparatus 1A has the lighting section 4a that provides illumination in the direction of photographing by the photographic lens 3a. The lighting section 4a is formed by the LED, for example.

In addition, the imaging apparatus 1A has the microphone 6a for collecting the external sounds.

In this case, as described below, the imaging apparatus 1A contains a communication section for transmitting data of the photographed image to an external device. One example of the external device is a portable display apparatus 30, and the imaging apparatus 1A may transmit the photographed image data to this display apparatus 30. In this case, the display apparatus 30 receives the photographed image data and displays the received photographed image data on a display screen 31.

If the user carries the portable display apparatus 30, the user is able to monitor the photographed image therewith.

Although the portable display apparatus has been mentioned as the separate display apparatus 30, a stationary display apparatus, a computer apparatus, a television receiver, a mobile phone, a personal digital assistant (PDA), or the like is also usable as the separate display apparatus. In short, in the case of the imaging apparatus 1A without a monitoring display capability (or even in the case of the imaging apparatus 1 as illustrated in FIG. 1, which has the monitoring display capability), the photographed image data can be monitored with any external display apparatus.

Note that examples of the external device to which the photographed image data can be transmitted by the imaging apparatus 1 (or 1A) via its communication capability include, in addition to the various display devices as mentioned above, a video storage device, a computer apparatus, and a server apparatus. That is, it is conceivable that the photographed image data is stored in or delivered by the external device.

2. Exemplary Structures of Imaging Apparatus

Figure 3:
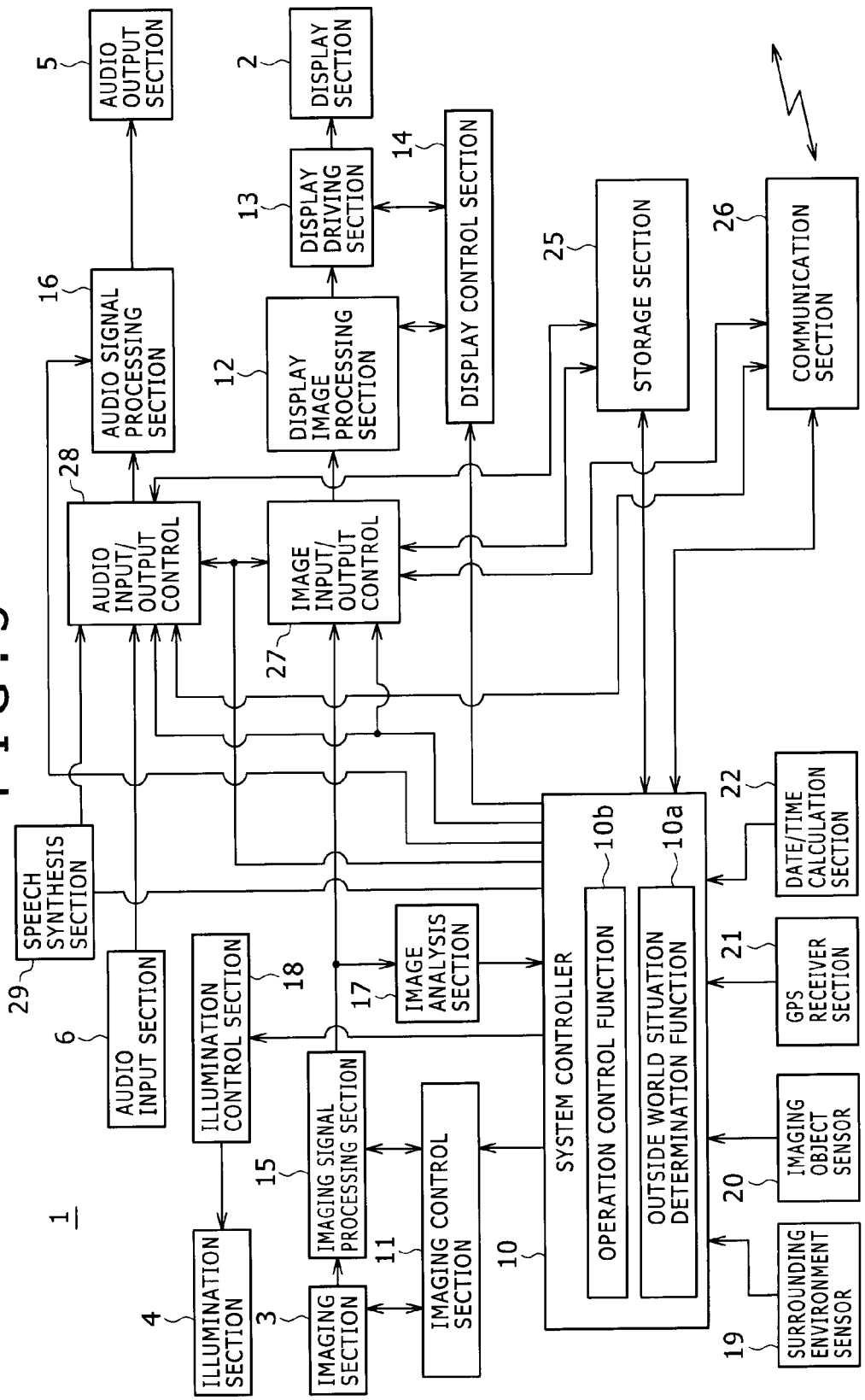
FIG. 3 is a block diagram of the imaging apparatus according to one embodiment of the present invention.

FIG. 3 illustrates an exemplary internal structure of the imaging apparatus 1 illustrated in FIG. 1. As described above, this imaging apparatus 1 is the spectacle-shaped display camera having both an imaging function and a display function.

A system controller 10 is formed by a microcomputer that includes a central processing unit (CPU), a read only memory (ROM), a random access memory (RAM), a nonvolatile memory section, and an interface section, for example, and controls an overall operation of the imaging apparatus 1.

Based on an outside world situation, the system controller 10 controls each part of the imaging apparatus 1. That is, the system controller 10 operates in accordance with an operating program for detecting and determining the outside world situation and controlling an operation of each part of the imaging apparatus 1 in accordance with the detected and determined outside world situation. Therefore, from the viewpoint of functions, the imaging apparatus 1 has, as shown in FIG. 3, an outside world situation determination function 10a of determining the outside world situation, and an operation control function 10b of issuing a control instruction to each part of the imaging apparatus 1 in accordance with the outside world situation determined by the outside world situation determination function 10a.

The imaging apparatus 1 includes, as units for photographing a scene ahead of the user, an imaging section 3, an imaging control section 11, and an imaging signal processing section 15.

The imaging section 3 includes: a lens system formed by the photographic lens 3a illustrated in FIG. 1, a diaphragm, a zoom lens, a focus lens, and the like; a driving system for allowing the lens system to perform a focusing operation, a zooming operation, and the like; and a solid-state imaging device array for detecting light for imaging obtained by the lens system, and subjecting the detected light to optical-to-electrical conversion to generate an imaging signal. The solid-state imaging device array is, for example, a charge coupled device (CCD) sensor array or a complementary metal oxide semiconductor (CMOS) sensor array.

The imaging signal processing section 15 includes a sample-hold/automatic gain control (AGC) circuit for subjecting the signal obtained by the solid-state imaging device in the imaging section 3 to gain control and waveform shaping, and a video A/D converter, and obtains an imaging signal in digital form. In addition, the imaging signal processing section 15 performs white balancing processing, brightness processing, color signal processing, blur correction processing, and the like on the imaging signal.

Based on an instruction issued from the system controller 10, the imaging control section 11 controls operations of the imaging section 3 and the imaging signal processing section 15. For example, the imaging control section 11 controls activation and deactivation of the operations of the imaging section 3 and the imaging signal processing section 15. In addition, the imaging control section 11 exercises control (motor control) for allowing the imaging section 3 to perform an operation such as autofocusing, automatic exposure adjustment, aperture adjustment, or zooming.

The imaging control section 11 includes a timing generator, and uses a timing signal generated by the timing generator to control signal processing operations performed by the solid-state imaging device, and the sample-hold/AGC circuit and the video A/D converter in the imaging signal processing section 15. Moreover, this timing control enables adjustment of an imaging frame rate.

In addition, the imaging control section 11 controls imaging sensitivity and signal processing in the solid-state imaging device and the imaging signal processing section 15. For example, as control of the imaging sensitivity, the imaging control section 11 is capable of performing the gain control on the signal read from the solid-state imaging device, and black level setting, control of various coefficients in processing the imaging signal in digital form, control of a correction value in the blur correction processing, and the like. Regarding the control of the imaging sensitivity, overall sensitivity adjustment with no regard to any particular wavelength range, and sensitivity adjustment of adjusting imaging sensitivity of a particular wavelength range such as an infrared range or an ultraviolet range (for example, imaging that involves cutting off the particular wavelength range) are possible, for example. Sensitivity adjustment in accordance with the wavelength is achieved by insertion of a wavelength filter in a photographic lens system or a wavelength filter operation process performed on the imaging signal. In these cases, the imaging control section 11 achieves the sensitivity control by controlling the insertion of the wavelength filter, specification of a filter operation coefficient, or the like.

The imaging signal (i.e., the photographed image data) obtained by imaging by the imaging section 3 and processing by the imaging signal processing section 15 is supplied to an image input/output control section 27.

Under control of the system controller 10, the image input/output control section 27 controls transfer of the image data. Specifically, the image input/output control section 27 controls transfer of the image data among an imaging system (i.e., the imaging signal processing section 15), an image monitoring display system (i.e., a display image processing section 12), a storage section 25, and a communication section 26.

For example, the image input/output control section 27 performs an operation of supplying the imaging signal (i.e., the image data) processed by the imaging signal processing section 15 to the display image processing section 12, the storage section 25, or the communication section 26.

Also, the image input/output control section 27 performs an operation of supplying image data reproduced from the storage section 25 to the display image processing section 12 or the communication section 26, for example.

Also, the image input/output control section 27 performs an operation of supplying image data received via the communication section 26 to the display image processing section 12 or the storage section 25, for example.

The imaging apparatus 1 includes, as units for presenting a display to the user, the display section 2, the display image processing section 12, a display driving section 13, and a display control section 14.

The imaging signal obtained by imaging by the imaging section 3 and processing by the imaging signal processing section 15 can be supplied to the display image processing section 12 via the image input/output control section 27. The display image processing section 12 is, for example, a so-called video processor, and is capable of performing various display processes on the supplied imaging signal. For example, the display image processing section 12 is capable of performing brightness level control, color correction, contrast control, sharpness (edge enhancement) control, and the like on the imaging signal.

In addition, the display image processing section 12 is also capable of: generation of a magnified image in which a part of the imaging signal is magnified; generation of a reduced image; image processing for highlighting (emphasizing) a part of an image; division or combination of an image(s) for split screen display of the photographed image; generation of a character image or a conceptual image; combination of a generated image with the photographed image; and the like. In short, the display image processing section 12 is capable of performing various processes on a digital video signal as the imaging signal.

The display driving section 13 is formed by a pixel driving circuit for allowing the imaging signal supplied from the display image processing section 12 to be displayed on the display section (e.g., a liquid crystal display) 2. That is, the display driving section 13 applies driving signals based on a video signal to pixels arranged in a matrix in the display section 2 with specified horizontal/vertical driving timing for displaying. In addition, the display driving section 13 is capable of controlling transmissivity of each of the pixels in the display section 2 to cause the display section 2 to enter the see-through state.

Based on an instruction issued from the system controller 10, the display control section 14 controls a processing operation of the display image processing section 12 and an operation of the display driving section 13. Specifically, the display control section 14 controls the display image processing section 12 to perform the aforementioned various processes. Also, the display control section 14 controls the display driving section 13 to switch between the see-through state and an image displaying state.

Hereinafter, as opposed to the "see-through state" in which the display section 2 is transparent or translucent, an operation of displaying the image on the display section 2 will be referred to as "monitoring display", and a state in which this operation is being performed will be referred to as a "monitoring display state".

The image data reproduced in the storage section 25 and the image data received via the communication section 26 can also be supplied to the display image processing section 12 via the image input/output control section 27. In this case, a reproduced image or a received image is outputted via the display section 2 by the above-described operations of the display image processing section 12 and the display driving section 13.

The imaging apparatus 1 further includes an audio input section 6, an audio signal processing section 16, and an audio output section 5.

The audio input section 6 includes the microphones 6a and 6b illustrated in FIG. 1, a microphone amplifier section for amplifying audio signals obtained by the microphones 6a and 6b, and an A/D converter, and outputs audio data.

The audio data obtained by the audio input section 6 is supplied to an audio input/output control section 28.

Under control of the system controller 10, the audio input/output control section 28 controls transfer of the audio data. Specifically, the audio input/output control section 28 controls transfer of the audio signal among the audio input section 6, the audio signal processing section 16, the storage section 25, and the communication section 26.

For example, the audio input/output control section 28 performs an operation of supplying the audio data obtained by the audio input section 6 to the audio signal processing section 16, the storage section 25, or the communication section 26.

Also, the audio input/output control section 28 performs an operation of supplying audio data reproduced in the storage section 25 to the audio signal processing section 16 or the communication section 26, for example.

Also, the audio input/output control section 28 performs an operation of supplying audio data received via the communication section 26 to the audio signal processing section 16 or the storage section 25, for example.

The audio signal processing section 16 is formed by a digital signal processor, a D/A converter, and the like, for example. The audio data obtained by the audio input section 6, the audio data reproduced in the storage section 25, or the audio data received via the communication section 26 is supplied to the audio signal processing section 16 via the audio input/output control section 28. Under control of the system controller 10, the audio signal processing section 16 performs a process such as volume control, tone control, or application of a sound effect on the supplied audio data. Then, the audio signal processing section 16 converts the processed audio data into an analog signal, and supplies the analog signal to the audio output section 5. Note that the audio signal processing section 16 is not limited to a unit that performs digital signal processing, but may be a unit that performs signal processing using an analog amplifier, an analog filter, or the like.

The audio output section 5 includes the pair of earphone speakers 5a illustrated in FIG. 1 and an amplifier circuit for the earphone speakers 5a.

The audio input section 6, the audio signal processing section 16, and the audio output section 5 enable the user to listen to an external sound, audio reproduced in the storage section 25, or audio received via the communication section 26.

Note that the audio output section 5 may be formed by a so-called bone conduction speaker.

The imaging apparatus 1 further includes a speech synthesis section 29. In accordance with an instruction issued from the system controller 10, the speech synthesis section 29 performs speech synthesis to output an audio signal.

The audio signal outputted from the speech synthesis section 29 is supplied to the audio signal processing section 16 via the audio input/output control section 28 and processed in the audio signal processing section 16, and the resulting audio signal is outputted to the user via the audio output section 5.

The speech synthesis section 29 generates an audio signal for a read speech described below, for example.

The storage section 25 is a unit for recording data on a predetermined storage medium and reproducing data from the predetermined storage medium. For example, the storage section 25 is formed by a hard disk drive (HDD). Needless to say, as this storage medium, various types of storage media are adoptable such as: a solid-state memory such as a flash memory, a memory card containing a fixed memory, an optical disk, a magneto-optical disk, and a hologram memory. A requirement for the storage section 25 is to be capable of recording and reproducing the data in accordance with the adopted storage medium.

The imaging signal (i.e., the image data) obtained by imaging by the imaging section 3 and processing by the imaging signal processing section 15 and the image data received via the communication section 26 can be supplied to the storage section 25 via the image input/output control section 27. In addition, the audio data obtained by the audio input section 6 and the audio data received via the communication section 26 can be supplied to the storage section 25 via the audio input/output control section 28.

Under control of the system controller 10, the storage section 25 encodes the supplied image or audio data for the data to be recorded on the storage medium, and records the encoded data on the storage medium.

In addition, under control of the system controller 10, the storage section 25 reproduces the recorded image or audio data. The image data reproduced is outputted to the image input/output control section 27, whereas the audio data reproduced is outputted to the audio input/output control section 28.

The communication section 26 transmits and receives data to and from the external device. As described above, examples of the external device include various devices having information processing and communication capabilities, such as the display apparatus 30 as illustrated in FIG. 2, a computer device, a personal digital assistant (PDA), a mobile phone, video equipment, an audio system, and a tuner device.

Other examples of the external device with which the communication section 26 is capable of communicating include a terminal device and a server device connected to a network such as the Internet.

Other examples of the external device include a contactless IC card that contains an IC chip, a two-dimensional bar code such as a QR Code, and a hologram memory. In these cases, the communication section 26 reads information from these external devices.

Further, another imaging apparatus 1 (1A) is also conceivable as the external device.

The communication section 26 may be configured to perform network communication via short-range wireless communication for a network access point in accordance with a system such as a wireless LAN and Bluetooth. Alternatively, the communication section 26 may perform wireless communication directly with the external device having a corresponding communication capability.

The imaging signal (i.e., the image data) obtained by imaging by the imaging section 3 and processing by the imaging signal processing section 15 and the image data reproduced in the storage section 25 can be supplied to the communication section 26 via the image input/output control section 27. In addition, the audio data obtained by the audio input section 6 and the audio data reproduced in the storage section 25 can be supplied to the communication section 26 via the audio input/output control section 28.

Under control of the system controller 10, the communication section 26 subjects the supplied image or audio data to encoding, modulation, and the like for transmission, and transmits the resulting data to the external device.

The communication section 26 also performs an operation of receiving data from the external device. Image data received and demodulated is outputted to the image input/output control section 27, whereas audio data received and demodulated is outputted to the audio input/output control section 28.

The imaging apparatus 1 further includes an illumination section 4 and an illumination control section 18. The illumination section 4 is formed by the lighting section 4a illustrated in FIG. 1 and a lighting circuit for allowing the lighting section 4a (e.g., the LED) to emit light. Based on an instruction issued from the system controller 10, the illumination control section 18 causes the illumination section 4 to perform a lighting operation.

Because the lighting section 4a in the illumination section 4 is arranged to illuminate the scene ahead of the user as illustrated in FIG. 1, the illumination section 4 performs an operation of providing illumination in the direction in which the user sees.

The imaging apparatus 1 includes, as units for acquiring outside world information, a surrounding environment sensor 19, an imaging object sensor 20, a GPS receiver section 21, a date/time calculation section 22, an image analysis section 17, and the above-described communication section 26.

Specific examples of the surrounding environment sensor 19 include an illumination sensor, a temperature sensor, a humidity sensor, and an atmospheric pressure sensor. The surrounding environment sensor 19 is a sensor for obtaining information for detecting the brightness, temperature, humidity, weather, or the like of surroundings, as the surrounding environment of the imaging apparatus 1.

The imaging object sensor 20 is a sensor for detecting information concerning an imaging object, i.e., a subject of an imaging operation in the imaging section 3. One example of the imaging object sensor 20 is a distance-measuring sensor for detecting information of a distance from the imaging apparatus 1 to the imaging object.

Another example of the imaging object sensor 20 is a sensor (e.g., an infrared sensor such as a pyroelectric sensor) for detecting information or energy of, for example, a particular wavelength in infrared rays emitted by the imaging object. In this case, it is possible to detect whether or not the imaging object is a living body such as a human being or an animal, for example.

Another example of the imaging object sensor 20 is a sensor (e.g., various types of ultraviolet (UV) sensors) for detecting information or energy of, for example, a particular wavelength in ultraviolet rays emitted by the imaging object. In this case, it is possible, for example, to detect whether or not the imaging object is a fluorescent substance or a fluorescent body, and to detect the amount of ultraviolet rays in the outside world, which is necessary for sunburn prevention.

The GPS receiver section 21 receives a radio wave from a global positioning system (GPS) satellite, and outputs information of the latitude and longitude of a current position.

The date/time calculation section 22 serves as a so-called clock section to calculate a date and time (year, month, day, hour, minute, second), and outputs information of the current date and time.

The image analysis section 17 performs image analysis with respect to the photographed image obtained by the imaging section 3 and the imaging signal processing section 15. That is, the image analysis section 17 analyzes an image of a subject to obtain information concerning the subject included in the photographed image.

The communication section 26 performs data communication with the various external devices mentioned above to acquire various types of information from the external devices.

Information concerning the outside world for the imaging apparatus 1 is acquired by the surrounding environment sensor 19, the imaging object sensor 20, the GPS receiver section 21, the date/time calculation section 22, the image analysis section 17, and the communication section 26, and the acquired information is supplied to the system controller 10.

In accordance with the outside world information acquired via processing of the outside world situation determination function 10a, the system controller 10 exercises control related to the imaging operation or a display operation via processing of the operation control function 10b. That is, the system controller 10 controls the operations of the imaging section 3 and the imaging signal processing section 15 by issuing the instruction to the imaging control section 11, and also controls the operations of the display image processing section 12 and the display driving section 13 by issuing the instruction to the display control section 14. In addition, the system controller 10 controls the operations of the storage section 25 and the communication section 26.

Note that although the surrounding environment sensor 19, the imaging object sensor 20, the GPS receiver section 21, the date/time calculation section 22, the image analysis section 17, and the communication section 26 have been described above as the units for acquiring the outside world information, it is not necessary that the imaging apparatus 1 include all of these units. Also note that the imaging apparatus 1 may include another sensor, such as an audio analysis section for detecting and analyzing surrounding sound.

Next, FIG. 4 illustrates an exemplary structure of the imaging apparatus 1A as illustrated in FIG. 2, which does not have the monitoring display capability. Note that in FIG. 4, functional blocks having corresponding functional blocks in FIG. 3 are assigned the same reference numerals as in FIG. 3, and redundant description is avoided.

The structure illustrated in FIG. 4 is different from the structure illustrated in FIG. 3 in that the display section 2, the display image processing section 12, the display driving section 13, the display control section 14, the audio signal processing section 16, the audio output section 5, and the speech synthesis section 29 are omitted.

For example, the imaging signal (i.e., the image data) obtained by imaging by the imaging section 3 and processing by the imaging signal processing section 15 and the image data received by the communication section 26 can be supplied to the storage section 25 via the image input/output control section 27. Further, the audio data obtained by the audio input section 6 and the audio data received by the communication section 26 can be supplied to the storage section 25 via the audio input/output control section 28.

Under control of the system controller 10, the storage section 25 encodes the supplied image or audio data for the data to be recorded on the storage medium, and records the encoded data on the storage medium.

In addition, under control of the system controller 10, the storage section 25 reproduces the recorded image or audio data. The image data reproduced is outputted to the image input/output control section 27, whereas the audio data reproduced is outputted to the audio input/output control section 28.

The imaging signal (i.e., the image data) obtained by imaging by the imaging section 3 and processing by the imaging signal processing section 15 and the image data reproduced in the storage section 25 can be supplied to the communication section 26 via the image input/output control section 27. In addition, the audio data obtained by the audio input section 6 and the audio data reproduced in the storage section 25 can be supplied to the communication section 26 via the audio input/output control section 28.

Under control of the system controller 10, the communication section 26 subjects the supplied image or audio data to encoding, modulation, and the like for transmission, and transmits the resulting data to the external device. For example, the imaging signal (i.e., the image data) obtained by imaging by the imaging section 3 and processing by the imaging signal processing section 15 may be transmitted to the display apparatus 30 illustrated in FIG. 2 so that the photographed image can be monitored with the display apparatus 30.

The communication section 26 also performs the operation of receiving data from the external device. Image data received and demodulated is outputted to the image input/output control section 27, whereas audio data received and demodulated is outputted to the audio input/output control section 28.

In the structure illustrated in FIG. 4 also, the surrounding environment sensor 19, the imaging object sensor 20, the GPS receiver section 21, the date/time calculation section 22, the image analysis section 17, and the communication section 26 are provided as the units for acquiring the outside world information.

Needless to say, in this structure also, another sensor, such as the audio analysis section for detecting and analyzing the surrounding sound may be provided.

3. Exemplary Photographed Images

In the imaging apparatus 1 (1A) according to the present embodiment, the system controller 10 exercises control related to the imaging operation in accordance with the acquired outside world information, so that appropriate imaging is achieved without the need for the user to perform an operation of the operation unit, such as a key operation, a dial operation, or the like.

Here, with reference to FIGS. 5A to 11C, various exemplary photographed images will be described.

Figure 5A:
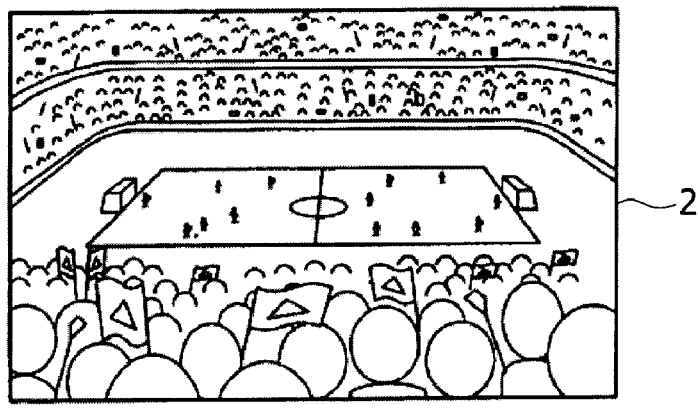
FIGS. 5A to 5C are illustrations for describing a see-through state, a regular photographed image, a telephoto image, respectively, according to one embodiment of the present invention.

FIG. 5A illustrates a case where the display section 2 included in the imaging apparatus 1 as illustrated in FIGS. 1 and 3 is in the see-through state. In other words, FIG. 5A illustrates a scene that the user sees through the display section 2. At this time, the display section 2 is in a state of being simply a transparent plate, and the user is viewing the scene within his or her field of vision through the transparent display section 2.

Figure 5B:
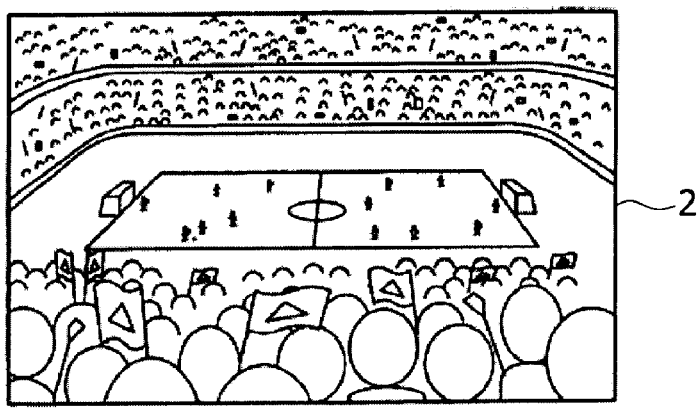

FIG. 5B illustrates the monitoring display state in which the image photographed by the imaging section 3 is being displayed on the display section 2. The display section 2 will enter this state if, when the display section 2 is in the state as illustrated in FIG. 5A, the imaging section 3, the imaging signal processing section 15, the display image processing section 12, and the display driving section 13 operate to display the photographed image on the display section 2 in a regular manner, for example. The photographed image (i.e., a regular photographed image) being displayed on the display section 2 in this case is nearly the same as the scene the user would see through the display section 2 in the see-through state. That is, when the display section 2 is in this state, the user views a photographed image that represents a regular scene within his or her field of vision.

Figure 5C:
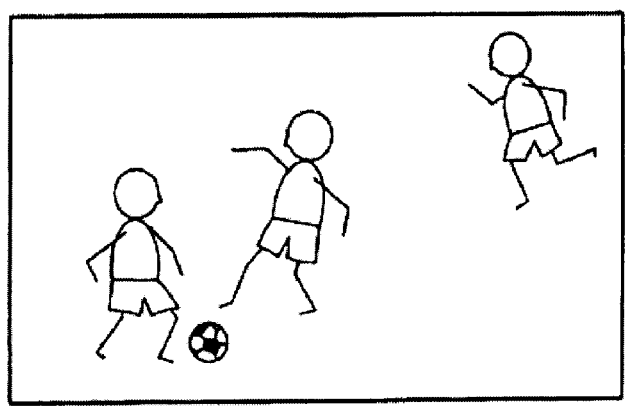

FIG. 5C illustrates an example of a photographed image obtained when the system controller 10 has instructed the imaging control section 11 to control the imaging section 3 to take a telephoto. As a result of taking such a telephoto, the user is able to view the telephoto via the display section 2 as illustrated in FIG. 1 or the display apparatus 30 as illustrated in FIG. 2, for example. In addition, such a telephoto can be recorded in the storage section 25 or transmitted to the external device via the communication section 26 to be stored in the external device.

Figure 6A:
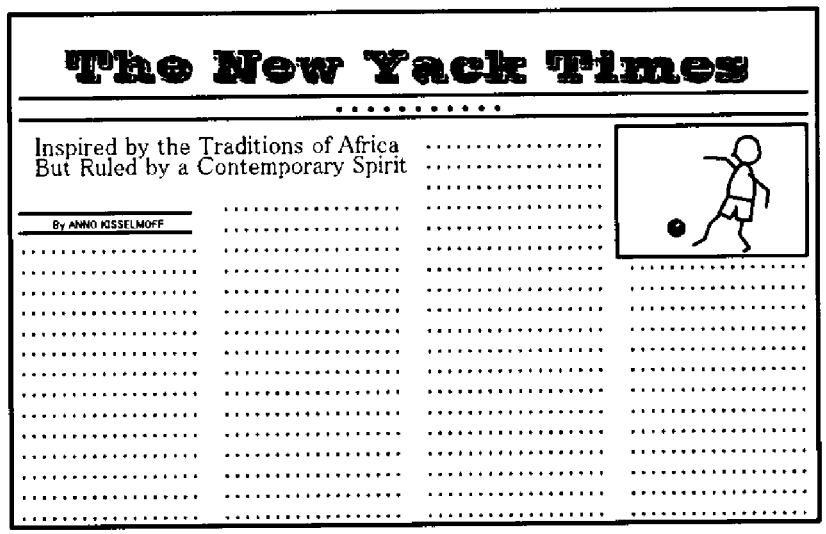
FIGS. 6A and 6B are illustrations for describing a wide-angle image according to one embodiment of the present invention.

FIG. 6A illustrates a regular photographed image. In this case, the user is watching a newspaper or the like.

Figure 6B:
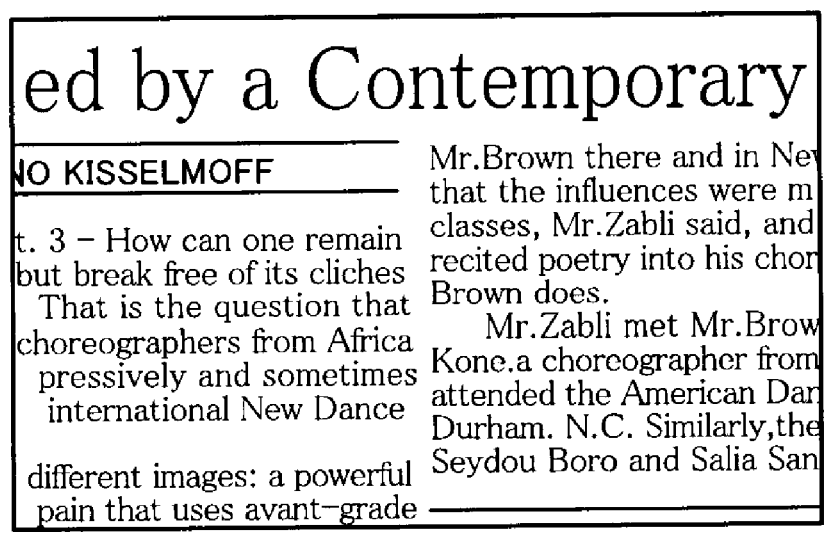

FIG. 6B illustrates a photographed image obtained by photographing in a so-called wide-angle zoom mode. Specifically, this photographed image is an image which has been photographed with zooming and with a short focal length and so processed that letters on the newspaper or the like will be magnified, for example.

If the system controller 10 instructs the imaging control section 11 to control the imaging section 3 to take a wide-angle photograph, such a wide-angle image of a scene nearby will be obtained.

Note that telephoto/wide-angle control can be achieved by drive control of the zoom lens in the imaging section 3 as well as by signal processing in the imaging signal processing section 15.

Figure 7A:
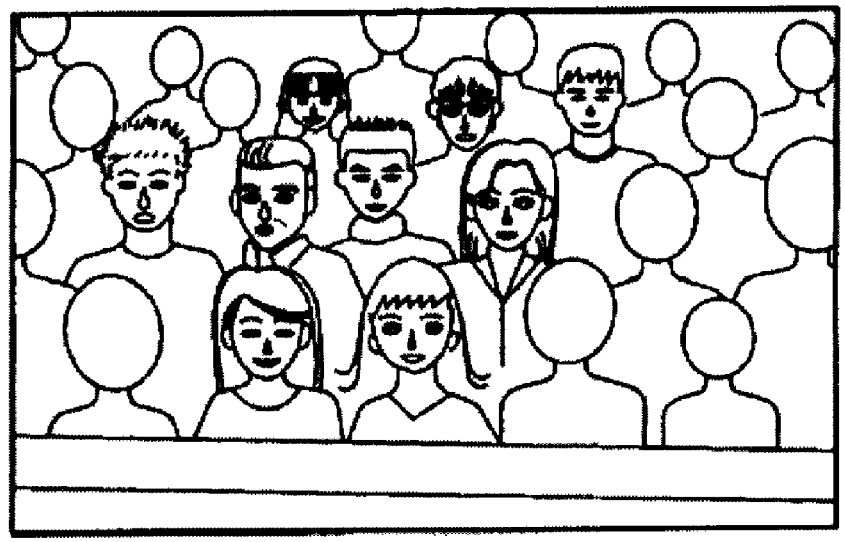
FIGS. 7A and 7B are illustrations for describing a magnified image according to one embodiment of the present invention.
Figure 7B:
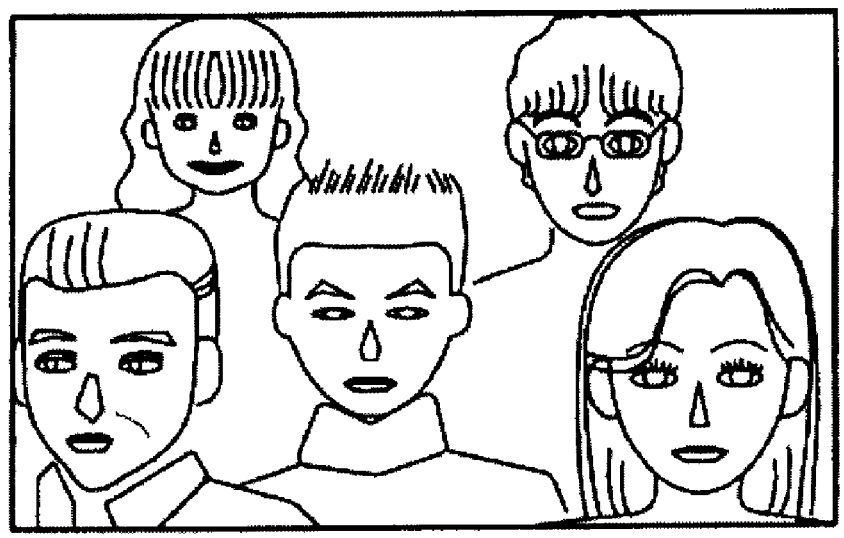

FIG. 7A illustrates a regular photographed image, and FIG. 7B illustrates a magnified image. The magnified image as illustrated in FIG. 7B can be obtained by, when the scene as illustrated in FIG. 7A is being photographed, the system controller 10 instructing the imaging control section 11 to control the imaging signal processing section 15 to perform an image magnification process.

Figure 8A:
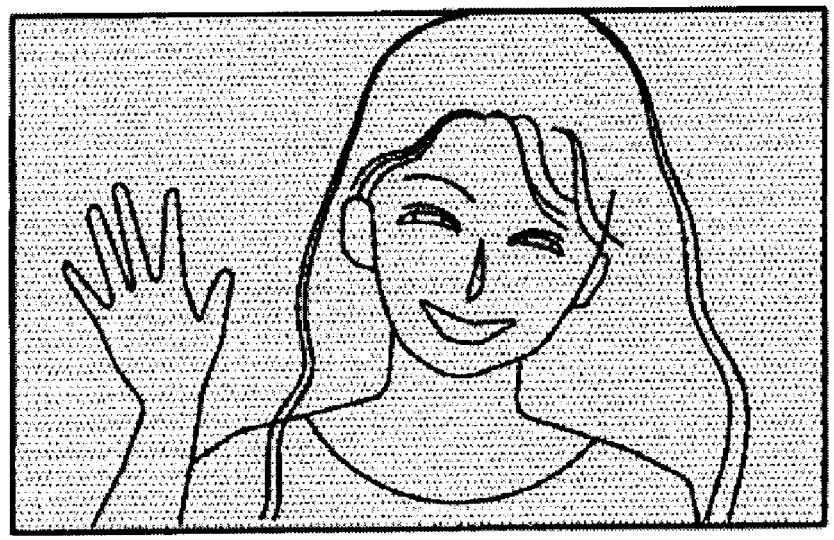
FIGS. 8A and 8B are illustrations for describing an adjusted image according to one embodiment of the present invention.

FIG. 8A illustrates a regular photographed image. Since it is a little dark in the surroundings, this regular photographed image is a dim image.

Figure 8B:

In this case, the system controller 10 is able to instruct the imaging control section 11 (i.e., the imaging section 3 or the imaging signal processing section 15) to increase imaging sensitivity or to control a brightness level, contrast, or sharpness in processing the imaging signal to obtain a clearer and brighter photographed image as illustrated in FIG. 8B. Note that it is preferable that the illumination section 4 be controlled to provide illumination when this type of photographing is carried out.

Figure 9A:
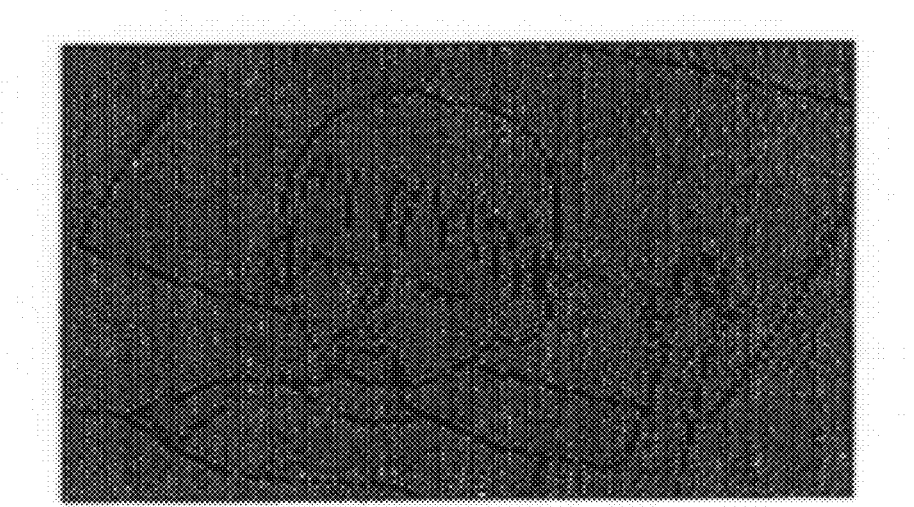
FIGS. 9A and 9B are illustrations for describing an image photographed with increased infrared sensitivity according to one embodiment of the present invention.

FIG. 9A illustrates a regular photographed image, taken when the user is in a dark room where a child is sleeping, for example. Because the user is in the dark room, this regular photographed image does not show the child and so on clearly.

Figure 9B:
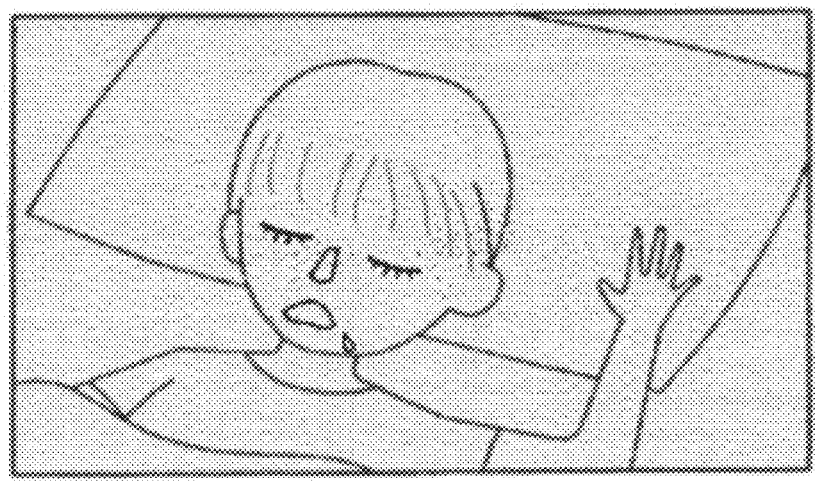

In this case, the system controller 10 is able to instruct the imaging control section 11 (i.e., the imaging section 3 or the imaging signal processing section 15) to increase infrared imaging sensitivity to obtain an infrared image as illustrated in FIG. 9B, in which a face of the child sleeping in the dark room and so on are recognizable.

Figure 10A:
FIGS. 10A and 10B are illustrations for describing an image photographed with increased ultraviolet sensitivity according to one embodiment of the present invention.
Figure 10B:

FIG. 10A illustrates a regular photographed image. In this case, the system controller 10 is able to instruct the imaging control section 11 (i.e., the imaging section 3 or the imaging signal processing section 15) to increase ultraviolet imaging sensitivity to obtain a photographed image as illustrated in FIG. 10B in which ultraviolet components are shown.

Figure 11A:
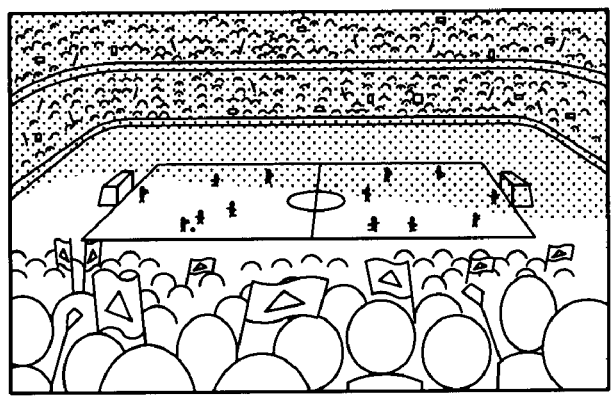
FIGS. 11A to 11C are illustrations for describing an adjusted image and a highlighted image according to one embodiment of the present invention.

FIG. 11A illustrates a regular photographed image. In this image, a boundary between a shady region and a sunny region appears on a pitch in a soccer stadium, for example, resulting in poor visibility.

Figure 11B:
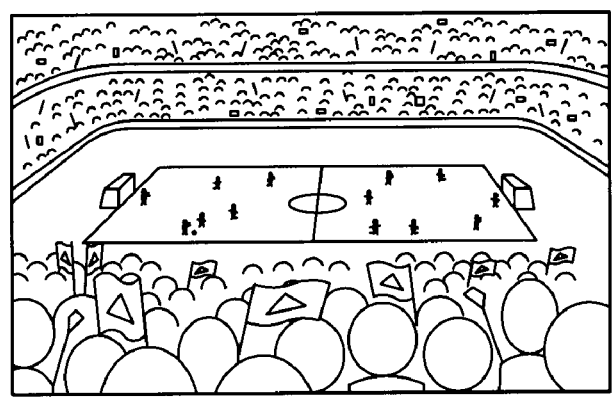

In this case, the system controller 10 is able to issue an instruction to increase, in a CCD sensor or a CMOS sensor, for example, the imaging sensitivity or brightness with respect to pixels in an area corresponding to the shady region and decrease the imaging sensitivity or brightness with respect to pixels in an area corresponding to the sunny region to obtain an image as illustrated in FIG. 11B in which influence of the sunny and shady regions is reduced.

Figure 11C:

FIG. 11C illustrates an image including a bird as an example of a specified object. In this image, the bird is highlighted.

In the case where the bird is detected in the image, a part of the image corresponding to the bird may be subjected to a highlighting process. As a result, a photographed image with which the user is able to recognize the bird (i.e., an example of the specified object) easily is obtained.

There are various techniques for highlighting the specified object in the image, such as: a technique of increasing the brightness of only a part of the image on which attention should be concentrated; a technique of decreasing the brightness of the other parts of the image than the part on which attention should be concentrated; and a technique of expressing the part of the image on which attention should be concentrated in color while expressing the other parts of the image in black and white.

Various types of exemplary photographed images have been described above, but it should be appreciated that the above-described exemplary photographed images are only illustrative and not restrictive. In the present embodiment, various types of photographed images can be obtained in a variety of imaging modes by controlling the imaging section 3 and/or the imaging signal processing section 15 to perform appropriate processes or operations.

A great variety of forms of photographed images are conceivable, such as: a telephoto image; a wide-angle image; an image photographed while zooming in or zooming out is performed within a range between a telephoto extreme and a wide-angle extreme; a magnified photographed image; a reduce photographed image; an image photographed with a varied frame rate (e.g., photographed with a high frame rate, or photographed with a low frame rate); a photographed image with increased brightness; a photographed image with reduced brightness; a photographed image with varied contrast; a photographed image with varied sharpness; an image photographed with increased imaging sensitivity; an image photographed with increased infrared imaging sensitivity; an image photographed with increased ultraviolet imaging sensitivity; an image photographed with a particular wavelength range cut off; effect-applied photographed images, such as a mosaic image, a brightness-reversed image, a soft-focus image, an image with a part of the image highlighted, and an image with varied overall color atmosphere; and a still photographed image.

4. Detection of Outside World Information

As described above, the imaging apparatus 1 (1A) according to the present embodiment has, as the units for acquiring the outside world information, the surrounding environment sensor 19, the imaging object sensor 20, the GPS receiver section 21, the date/time calculation section 22, the image analysis section 17, and the communication section 26.

Examples of the surrounding environment sensor 19 include the illumination sensor, the temperature sensor, the humidity sensor, and the atmospheric pressure sensor.

The illumination sensor is capable of detecting information of the brightness of the surroundings of the imaging apparatus 1.

The temperature sensor, the humidity sensor, and the atmospheric pressure sensor are capable of obtaining information for determining the temperature, the humidity, the atmospheric pressure, or the weather.

By using these surrounding environment sensors 19, the imaging apparatus 1 is able to determine the brightness of the surroundings or, when located outdoors, weather conditions or the like. Accordingly, the system controller 10 is able to use such information as the outside world information to control the imaging operation appropriately in accordance with the brightness or weather conditions of the surroundings.

The imaging object sensor 20 detects the information concerning the imaging object. Examples of the imaging object sensor 20 include the distance-measuring sensor and the pyroelectric sensor, and it is possible to obtain the distance to the imaging object or information for identifying the imaging object.

The detection of the distance to the imaging object enables the system controller 10 to control the imaging operation in accordance with the detected distance. As a result of detecting that the imaging object is a living body such as a human being, the system controller 10 becomes able to control the imaging operation in accordance with the imaging object.

The GPS receiver section 21 acquires the information of the latitude and longitude of the current position. When the latitude and longitude has been detected, it is possible to obtain information concerning a place (or the neighborhood of a place) at the current position by referring to a map database or the like. Although no particular mention has been made when describing the structures of FIGS. 3 and 4, the imaging apparatus 1 may include, as a storage medium that the system controller 10 is able to refer to, for example, a storage medium having a relatively large capacity such as a hard disk drive (HDD), flash memory, or the like, and this storage medium may store the map database. This makes it possible to acquire information related to the current position.

It is not necessary, however, that the imaging apparatus 1 (1A) contain the map database. For example, the imaging apparatus 1 may access a network server or a device that contains the map database via the communication section 26, transmit the latitude and longitude of the current position thereto to request the information related to the current position, and receive the information.

Examples of the information related to the current position include name information such as a name of a place, a name of a structure, a name of a facility, a name of a store, and a name of a station at or near the current position.

Other examples of the information related to the current position include information representing the type of a structure such as a park, a theme park, a concert hall, a theater, a movie theater, a sports facility, or the like.

Other examples of the information related to the current position include information of the type or name of a natural object, such as a seashore, a sea, a river, a mountainous region, a mountain peak, a forest, a lake, a plain, or the like.

Further, as more detailed position information, it is possible to acquire information of an area within the theme park, the stands in a ballpark, the soccer stadium, or the like, seats in the concert hall, and the like as the information concerning the current position.

By acquiring the information concerning the current position, the system controller 10 is able to control the imaging operation or the display operation in accordance with geographical conditions or facilities at or near the current position.

The date/time calculation section 22 calculates the date and time (year, month, day, hour, minute, second), for example. By using the date/time calculation section 22, the system controller 10 is able to recognize the current time, whether it is day or night now, the month, a season, and the like. Accordingly, the system controller 10 is able to control the imaging operation or the display operation appropriately in accordance with whether it is day or night (i.e., the time), or control the imaging operation in accordance with the current season, for example.

The image analysis section 17 is capable of detecting, from the photographed image, the following various types of information concerning the imaging object.

First, the image analysis section 17 is capable of identifying a person, an animal, a natural object, a structure, a device, and the like included in the photographed image, as the type of the imaging object. Regarding the animal, for example, the image analysis section 17 is capable of recognizing a situation in which a bird is being photographed as the subject, a situation in which a cat is being photographed, and so on. Regarding the natural object, the image analysis section 17 is capable of identifying a sea, a mountain, a tree, a river, a lake, the sky, the sun, the moon, and so on. Regarding the structure, the image analysis section 17 is capable of identifying a house, a building, a stadium, and so on. Regarding the device, the image analysis section 17 is capable of recognizing a situation in which the imaging object is a personal computer, audiovisual (AV) equipment, a mobile phone, a PDA, an IC card, a two-dimensional bar code, or the like.

Identification of the type of the imaging object is achieved by registering characteristics of the shapes of various types of objects beforehand, and determining whether the photographed image includes a subject that coincides in shape with any of the various types of objects.

The image analysis performed by the image analysis section 17 is able to detect a motion (e.g., a quick motion) of a subject in the image using a technique of detecting differences between adjacent frames of the image. In the case where a player is being photographed when the user is watching a sport, or in the case where a car or the like that is moving is being photographed, for example, it is possible to detect a situation in which a subject that is moving fast is being photographed.

In addition, by the image analysis performed by the image analysis section 17, it is also possible to determine surrounding conditions. For example, it is possible to determine brightness conditions, which varies depending on whether it is day or night now and depending on the weather, and it is also possible to recognize the intensity of rain and the like.

In addition, the image analysis performed by the image analysis section 17 is able to detect a situation in which a book, a newspaper, or the like is being photographed, for example. This is achieved by performing character recognition in the image, or recognizing the shape of the book, the newspaper, or the like, for example.

In the case where the image analysis section 17 has performed the character recognition, the system controller 10 is able to supply a recognized letter to the speech synthesis section 29 as text data.

In addition, in the case where the subject is a person, the image analysis performed by the image analysis section 17 is able to identify the individual person based on the face of the person. As is known, human faces can be analyzed to obtain information of relative positions of face components, and this information can be used as personal characteristic data. For example, a ratio (Ed/EN) of a distance Ed between eyes to a distance EN between the center of an eye and a nose, and a ratio (Ed/EM) of the distance Ed between the eyes to a distance EM between the center of the eye and a mouth are known to be information that is particular to each individual and is not affected by changes in appearance caused by hair style, a worn object such as spectacles, or the like. It is also known that these ratios are not changed by aging.

Thus, in the case where a face of a certain person is included in the photographed image, the image analysis section 17 is able to analyze the image to detect the personal characteristic data as described above.

Suppose that the imaging apparatus 1 includes, as the storage medium that the system controller 10 is capable of referring to, for example, the hard disk drive (HDD), the flash memory, or the like, and that a people database is stored in this storage medium. In this case, when the personal characteristic data is detected from the photographed image, it is possible to acquire information of an individual who is the subject. However, it is not necessary that the imaging apparatus 1 (1A) contain the people database. For example, the imaging apparatus 1 may access the network server or a device that contains the people database, for example, via the communication section 26, transmit the personal characteristic data thereto to request the information, and receive the information of the particular person.

For example, the user may register personal information of a person with whom the user met in the past, such as the name, position, or the like of that person, in the people database together with the personal characteristic data of that person. In this case, when the user meets this person (i.e., when this person is photographed), the system controller 10 is able to retrieve the information of this person.

Further, people database in which information of celebrities and the personal characteristic data of the celebrities are registered may be prepared. In this case, when the user meets any of the celebrities, the system controller 10 is able to retrieve information of that celebrity.

The communication section 26 is able to acquire various types of information as the outside world information.

For example, the communication section 26 is able to acquire information that has been retrieved in the external device in accordance with the latitude and longitude of the current position, the personal characteristic data, or the like transmitted from the imaging apparatus 1 as described above.

Further, the communication section 26 is able to acquire, from the external device, information concerning the weather conditions, such as weather information, temperature information, humidity information, or the like.

Still further, the communication section 26 is able to acquire, from the external device, information concerning use of a facility, information of whether photography is prohibited or permitted in the facility, guide information, or the like.

Still further, the communication section 26 is able to acquire identification information of the external device. Examples of the identification information of the external device include a type, a device ID, and the like of a device that is identified as a network device in a predetermined communications protocol.

Still further, the communication section 26 is able to acquire image data stored in the external device, image data being reproduced or displayed in the external device, image data received by the external device, and so on.

Examples of the information that can be acquired by the surrounding environment sensor 19, the imaging object sensor 20, the GPS receiver section 21, the date/time calculation section 22, the image analysis section 17, and the communication section 26 have been described above. Some types of outside world information may be detected by two or more of the above units.

For example, a combination of the information of the humidity or the like acquired by the surrounding environment sensor 19 and the weather information received by the communication section 26 can be used to recognize the current weather more precisely.

Further, a combination of the information concerning the current position acquired by the operations of the GPS receiver section 21 and the communication section 26 and the information acquired by the image analysis section 17 can be used to recognize the conditions of the current position or the imaging object more precisely.

5. Various Exemplary Operations

As described above, in the imaging apparatus 1 (1A) according to the present embodiment, the system controller 10 determines the surrounding conditions, conditions of the imaging object, or the like based on the outside world information obtained by the surrounding environment sensor 19, the imaging object sensor 20, the GPS receiver section 21, the date/time calculation section 22, the image analysis section 17, or the communication section 26, and controls the imaging operation in accordance with the surrounding conditions, the conditions of the imaging object, or the like, so that appropriate or entertaining photographing is achieved.

Various exemplary operations performed under control of the system controller 10 for achieving the above will now be described below.

Note that, in the imaging apparatus 1 (1A), an imaging process system (i.e., the imaging section 3, the imaging signal processing section 15, and the imaging control section 11) may either be configured to perform the imaging operation at all times while power of the imaging apparatus 1 (1A) is on or be configured to start imaging when a trigger for the start of imaging has occurred while the power of the imaging apparatus 1 (1A) is on.

In other words, power-on control and imaging start control may be performed either at the same time or at different times.

For example, a power switch may be provided to allow the user to operate the power switch to cause the system controller 10 to turn the power of the imaging apparatus 1 (1A) on. Alternatively, a wearing sensor may be provided to detect that the user has worn the imaging apparatus 1 (1A) and accordingly cause the system controller 10 to turn the power of the imaging apparatus 1 (1A) on. In this case, after the power of the imaging apparatus 1 (1A) is turned on, imaging may be started when a predetermined imaging start trigger has occurred.

Alternatively, for example, the system controller 10 may turn the power of the apparatus on and start imaging simultaneously when the occurrence of the predetermined imaging start trigger is detected.

First, with reference to FIGS. 12, 13, and 14, exemplary control procedures performed by the system controller 10 as the operation control function 10b will now be described below.

Figure 12:
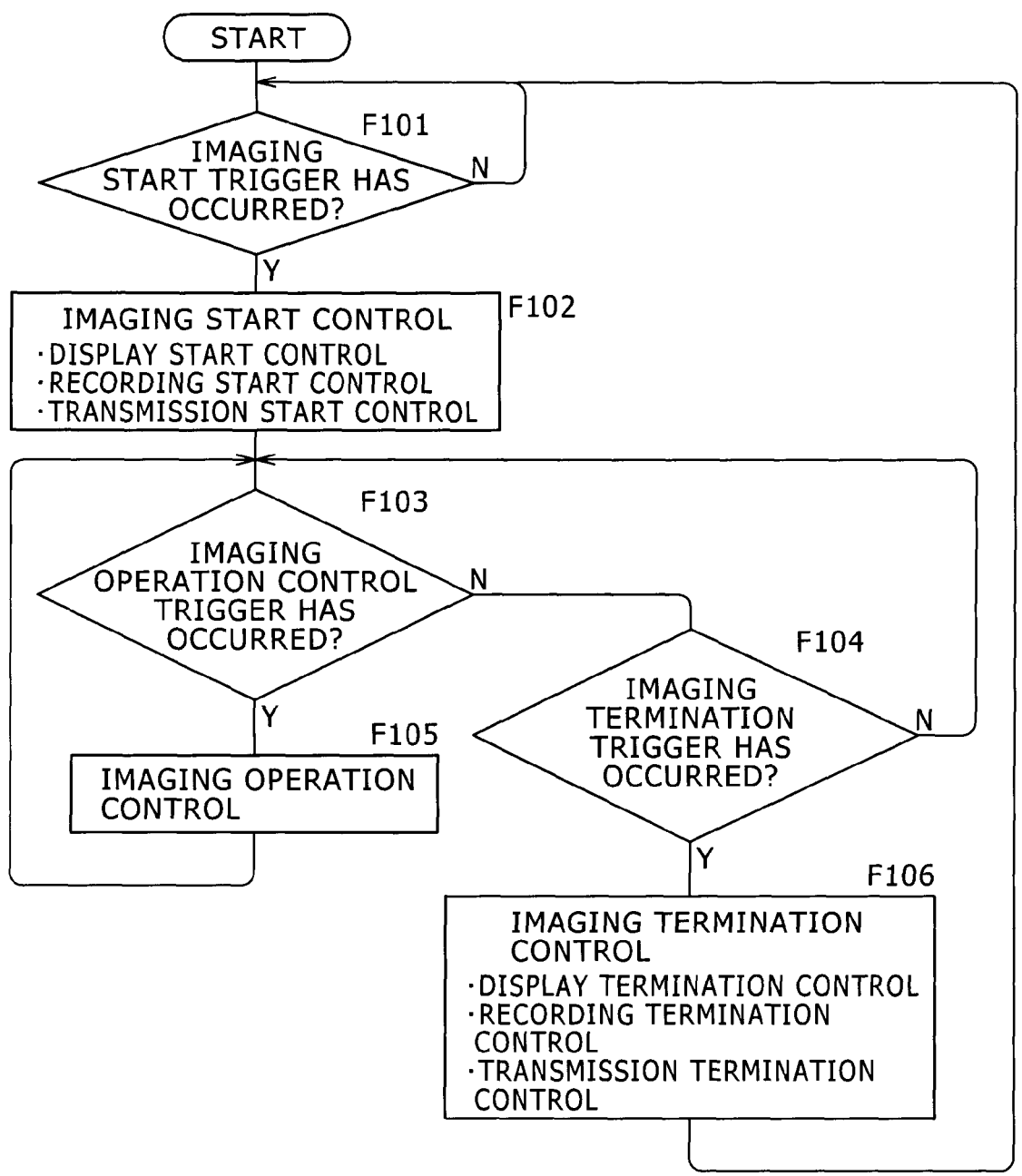
FIG. 12 is a flowchart illustrating a control procedure according to one embodiment of the present invention.

FIG. 12 illustrates an exemplary procedure in which, while the imaging operation is being performed, some or all of a monitoring display operation, a recording operation in the storage section 25, and a transmission operation in the communication section 26 will be performed simultaneously.

Note that the monitoring display operation refers to, in the case of the imaging apparatus 1 as illustrated in FIG. 1, an operation of causing the display section 2 to display the photographed image, and, in the case of the imaging apparatus 1A as illustrated in FIG. 2, an operation of transmitting the photographed image data to the display apparatus 30 via the communication section 26 so that the display apparatus 30 can perform monitoring display.

Also note that the transmission operation in the communication section 26 refers to an operation of transmitting the imaging signal (i.e., the image data) and the audio data to the display apparatus 30 or various other external devices as mentioned previously. The process (e.g., display/audio output, recording, transfer or delivery to another device, etc.) performed on the image data and the audio data in the device at the receiving end depends on the device at the receiving end.

At step F101 in FIG. 12, the system controller 10 is checking whether the imaging start trigger has occurred. The occurrence of the imaging start trigger means that, based on the outside world situation determined by the outside world situation determination function 10a, the system controller 10 itself decides to start the imaging operation. Examples of how the system controller 10 determines whether the imaging start trigger has occurred will be described later.

Note that the occurrence of the imaging start trigger may be determined when the user has performed a predetermined operation or when it has been detected that the user has worn the imaging apparatus 1 (1A).

When it is determined that the imaging start trigger has occurred, the system controller 10 proceeds to step F102, and performs the imaging start control. Specifically, the system controller 10 instructs the imaging control section 11 to start imaging, thereby causing the imaging section 3 and the imaging signal processing section 15 to perform a regular imaging operation.

In addition, at this time, the system controller 10 performs some or all of display start control, recording start control, and transmission start control.

In the case of the imaging apparatus 1 as illustrated in FIGS. 1 and 3, the display start control refers to control of instructing the display control section 14 to control the display image processing section 12 and the display driving section 13 to display the imaging signal on the display section 2 in a mode of the regular photographed image. Meanwhile, in the case of the imaging apparatus 1A as illustrated in FIGS. 2 and 4, the display start control refers to control of causing the photographed image data and the audio data to be transmitted to the external display apparatus 30 via the communication section 26.

The recording start control refers to control of causing the storage section 25 to start recording the photographed image data and the audio data.

The transmission start control refers to control of causing the communication section 26 to start transmitting the photographed image data and the audio data to the external device.

After the start of imaging, the system controller 10 monitors whether an imaging operation control trigger has occurred at step F103, and monitors whether an imaging termination trigger has occurred at step F104.

The occurrence of the imaging operation control trigger means that, based on the outside world situation determined by the outside world situation determination function 10a, the system controller 10 itself decides to change the mode of an imaging operation. The occurrence of the imaging termination trigger means that, based on the outside world situation determined by the outside world situation determination function 10*a*, the system controller 10 itself decides to terminate the imaging operation.

Examples of how the system controller 10 determines whether or not the imaging operation control trigger has occurred and whether or not the imaging termination trigger has occurred will be described later.

Note that the occurrence of the imaging termination trigger may be determined when the user has performed a predetermined operation or when it has been detected that the user has taken off the imaging apparatus 1 (1A), for example.

When it is determined that the imaging operation control trigger has occurred, the system controller 10 proceeds from step F103 to step F105, and exercises control related to the imaging operation. That is, the system controller 10 instructs the imaging control section 11 to perform the imaging operation in a mode suited to the outside world situation at the time.

After exercising control related to the mode of the imaging operation at step F105, the system controller 10 monitors the occurrence of the triggers at steps F103 and F104.

When it is determined that the imaging termination trigger has occurred, the system controller 10 proceeds from step F104 to step F106, and performs imaging termination control. Specifically, the system controller 10 instructs the imaging control section 11 to terminate imaging, thereby causing the imaging section 3 and the imaging signal processing section 15 to terminate the imaging operation.

In addition, at this time, the system controller 10 performs some or all of display termination control, recording termination control, and transmission termination control.

Specifically, in the case where the monitoring display operation has been started at step F102, the system controller 10 causes this operation to be terminated. Meanwhile, in the case where the recording operation has been started, the system controller 10 causes the recording operation in the storage section 25 to be terminated. Meanwhile, in the case where the transmission operation has been started, the system controller 10 causes the transmission operation in the communication section 26 to be terminated.

Then, the system controller 10 returns to step F101.

Figure 13:
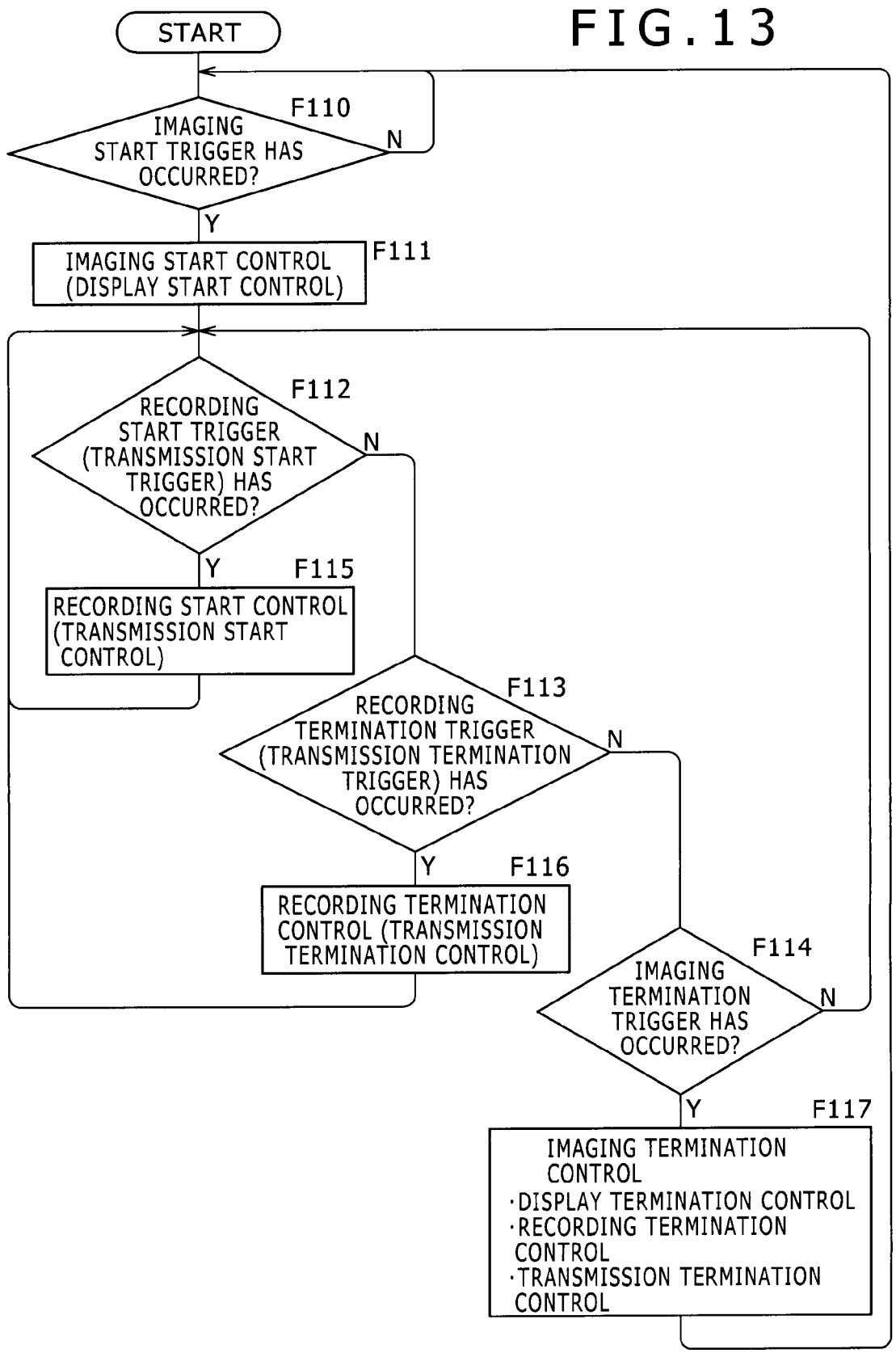
FIG. 13 is a flowchart illustrating another control procedure according to one embodiment of the present invention.

Next, FIG. 13 illustrates an exemplary procedure in which control of the start and termination of the recording operation in the storage section 25 and control of the start and termination of the transmission operation in the communication section 26 are performed independently of control of the start and termination of the imaging operation. Note that the imaging start control, the imaging termination control, the display start control, the display termination control, the recording start control, the recording termination control, the transmission start control, and the transmission termination control are the same in substance as those of FIG. 12.

At step F110 in FIG. 13, the system controller 10 is checking whether the imaging start trigger has occurred.

When it is determined that the imaging start trigger has occurred, the system controller 10 proceeds to step F111, and performs the imaging start control. In addition, at this time, the system controller 10 performs the display start control.

After starting imaging, the system controller 10 monitors whether the recording start trigger (or the transmission start trigger) has occurred at step F112, monitors whether the recording termination trigger (or the transmission termination trigger) has occurred at step F113, and monitors whether the imaging termination trigger has occurred at step F114.

The occurrence of the recording start trigger means that, based on the outside world situation determined by the outside world situation determination function 10*a*, the system controller 10 decides to start the recording operation in the storage section 25.

The occurrence of the recording termination trigger means that, based on the outside world situation determined by the outside world situation determination function 10*a*, the system controller 10 decides to terminate the recording operation in the storage section 25.

The occurrence of the transmission start trigger means that, based on the outside world situation determined by the outside world situation determination function 10*a*, the system controller 10 decides to start the transmission operation in the communication section 26.

The occurrence of the transmission termination trigger means that, based on the outside world situation determined by the outside world situation determination function 10*a*, the system controller 10 decides to terminate the transmission operation in the communication section 26.

Note that, in the case of the imaging apparatus 1A as illustrated in FIGS. 2 and 4, for example, the display start control performed at step F111 corresponds to control of starting transmission to the display apparatus 30 via the communication section 26. Therefore, the occurrence of the transmission start trigger and the occurrence of the transmission termination trigger depend on the assumption that the imaging apparatus 1 as illustrated in FIGS. 1 and 3 is used. It is conceivable, however, that the imaging apparatus 1A as illustrated in FIGS. 2 and 4 transmits the data to an external device other than the display apparatus 30 used for monitoring. Thus, the transmission start trigger and the transmission termination trigger can be considered as triggers for transmission control concerning such transmission.

When it is determined that the recording start trigger has occurred, the system controller 10 proceeds from step F112 to step F115, and controls the storage section 25 to start recording the photographed image data and the audio data.

When it is determined that the transmission start trigger has occurred, the system controller 10 similarly proceeds from step F112 to step F115, and controls the communication section 26 to start transmitting the photographed image data and the audio data to the external device.

After performing the recording start control or the transmission start control, the system controller 10 returns to a trigger monitoring loop at steps F112, F113, and F114.

When it is determined that the recording termination trigger has occurred, the system controller 10 proceeds from step F113 to step F116, and controls the storage section 25 to terminate the recording operation.

When it is determined that the transmission termination trigger has occurred, the system controller 10 similarly proceeds from step F113 to step F116, and controls the communication section 26 to terminate the transmission of the photographed image data and the audio data to the external device.

After performing the recording termination control or the transmission termination control, the system controller 10 returns to the trigger monitoring loop at steps F112, F113, and F114.

When it is determined that the imaging termination trigger has occurred, the system controller 10 proceeds from step F114 to step F117, and performs the imaging termination control. Specifically, the system controller 10 instructs the imaging control section 11 to terminate imaging, thereby causing the imaging section 3 and the imaging signal processing section 15 to terminate the imaging operation. In addition, at this time, the system controller 10 performs the display termination control.

Note that in the case where the recording operation or the transmission operation has not been terminated yet when the imaging termination trigger has occurred, the system controller 10 additionally performs the recording termination control or the transmission termination control at this time.

Then, the system controller 10 returns to step F110.

Figure 14:
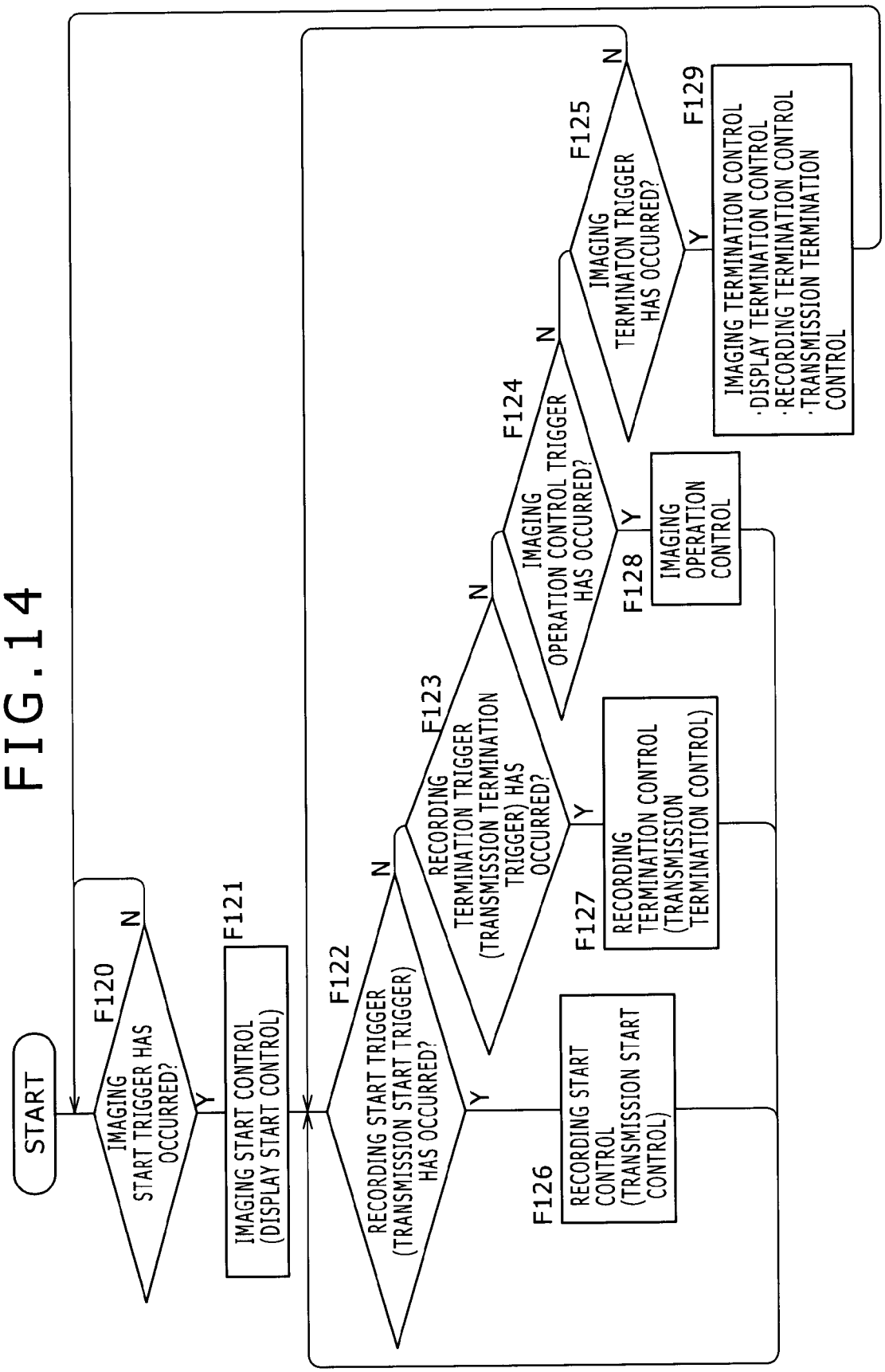
FIG. 14 is a flowchart illustrating yet another control procedure according to one embodiment of the present invention.

Next, FIG. 14 illustrates an exemplary procedure in which the control of the start and termination of the recording operation in the storage section 25 and the control of the start and termination of the transmission operation in the communication section 26 are performed independently of the control of the start and termination of the imaging operation, and in which control of the mode of the imaging operation is additionally performed. Note that the imaging start control, the imaging termination control, the display start control, the display termination control, the recording start control, the recording termination control, the transmission start control, and the transmission termination control are the same in substance as those of FIGS. 12 and 13.

At step F120 in FIG. 14, the system controller 10 is checking whether the imaging start trigger has occurred.

When it is determined that the imaging start trigger has occurred, the system controller 10 proceeds to step F121, and performs the imaging start control. In addition, at this time, the system controller 10 performs the display start control.

After starting imaging, the system controller 10 monitors whether the recording start trigger (or the transmission start trigger) has occurred at step F122, monitors whether the recording termination trigger (or the transmission termination trigger) has occurred at step F123, monitors whether the imaging operation control trigger has occurred at step F124, and monitors whether the imaging termination trigger has occurred at step F125.

When it is determined that the recording start trigger has occurred, the system controller 10 proceeds from step F122 to step F126, and controls the storage section 25 to start recording the photographed image data and the audio data.

When it is determined that the transmission start trigger has occurred, the system controller 10 similarly proceeds from step F122 to step F126, and controls the communication section 26 to start the transmission of the photographed image data and the audio data to the external device.

After performing the recording start control or the transmission start control, the system controller 10 returns to a trigger monitoring loop at steps F122, F123, F124, and F125.

When it is determined that the recording termination trigger has occurred, the system controller 10 proceeds from step F123 to step F127, and controls the storage section 25 to terminate the recording operation.

When it is determined that the transmission termination trigger has occurred, the system controller 10 similarly proceeds from step F123 to step F127, and controls the communication section 26 to terminate the transmission of the photographed image data and the audio data to the external device.

After performing the recording termination control or the transmission termination control, the system controller 10 returns to the trigger monitoring loop at steps F122, F123, F124, and F125.

When it is determined that the imaging operation control trigger has occurred, the system controller 10 proceeds from step F124 to step F128, and exercises control related to the imaging operation. That is, the system controller 10 instructs the imaging control section 11 to perform the imaging operation in a mode suited to an intention of the user or the situation at the time.

After exercising control related to the mode of the imaging operation at step F128, the system controller 10 returns to the trigger monitoring loop at steps F122, F123, F124, and F125.

When it is determined that the imaging termination trigger has occurred, the system controller 10 proceeds from step F125 to step F129, and performs the imaging termination control. Specifically, the system controller 10 instructs the imaging control section 11 to terminate imaging, thereby causing the imaging section 3 and the imaging signal processing section 15 to terminate the imaging operation. In addition, at this time, the system controller 10 performs the display termination control.

Note that in the case where the recording operation or the transmission operation has not been terminated yet when the imaging termination trigger has occurred, the system controller 10 additionally performs the recording termination control or the transmission termination control at this time.

Then, the system controller 10 returns to step F120.

With the operation control function 10b, the system controller 10 performs the above-described procedure of FIG. 12, 13, or 14, for example, to start or terminate imaging, switch the mode of the imaging operation, or start or terminate the recording operation or the transmission operation.

It has been assumed in the foregoing description that the control of the start or termination of imaging and the control of the start or termination of displaying are performed at the same time. Note, however, that in the case where the display section 2 is arranged in front of the eyes of the user as in the case of the structure illustrated in FIGS. 1 and 3, for example, the monitoring display may not be performed while imaging is being performed. In other words, the display section 2 may be controlled to enter the see-through state in accordance with the outside world situation. For example, in the exemplary procedures of FIGS. 13 and 14, the control of the start and termination of the recording operation and the control of the start and termination of the transmission operation are performed independently of the control of the start and termination of the imaging operation. Similarly, the control of the start and termination of the monitoring display operation may be performed independently of the control of the start and termination of the imaging operation. This can be achieved by determining whether or not a monitoring display start trigger has occurred and whether or not a monitoring display termination trigger has occurred.

In the above-described procedures of FIGS. 12, 13, and 14, the system controller 10 exercises control based on the determination of the occurrence of the imaging start trigger, the imaging operation control trigger, the imaging termination trigger, the recording start trigger, the recording termination trigger, the transmission start trigger, and the transmission termination trigger. Specific examples of manners for determining whether these triggers have occurred and specific examples of control will now be described below with reference to FIGS. 15 to 23.

FIGS. 15 to 23 illustrate exemplary procedures performed by the system controller 10 as the outside world situation determination function 10a. It is assumed that these procedures are performed in parallel with the above-described procedure of FIG. 12, 13, or 14 performed by the operation control function 10b. The parallel processing is achieved, for example, by detection procedures as illustrated in FIGS. 15 to 23 being regularly handled as interrupts while the system controller 10 is performing the procedure of FIG. 12, 13, or 14. Programs for the procedures as illustrated in FIGS. 15 to 23 may either be incorporated in a program for executing the procedure of FIG. 12, 13, or 14, or be separate programs that are called up regularly. That is, the forms of the programs are not limited.

FIGS. 15 to 22 illustrate exemplary procedures for determining the occurrence of the imaging operation control trigger determined at step F104 in FIG. 12 or at step F124 in FIG. 14. The occurrence of the imaging start trigger, the imaging termination trigger, the recording start trigger, the recording termination trigger, the transmission start trigger, and the transmission termination trigger also can be determined in accordance with the exemplary procedures illustrated in FIGS. 15 to 22, and descriptions thereof will be provided later.

Figure 15:
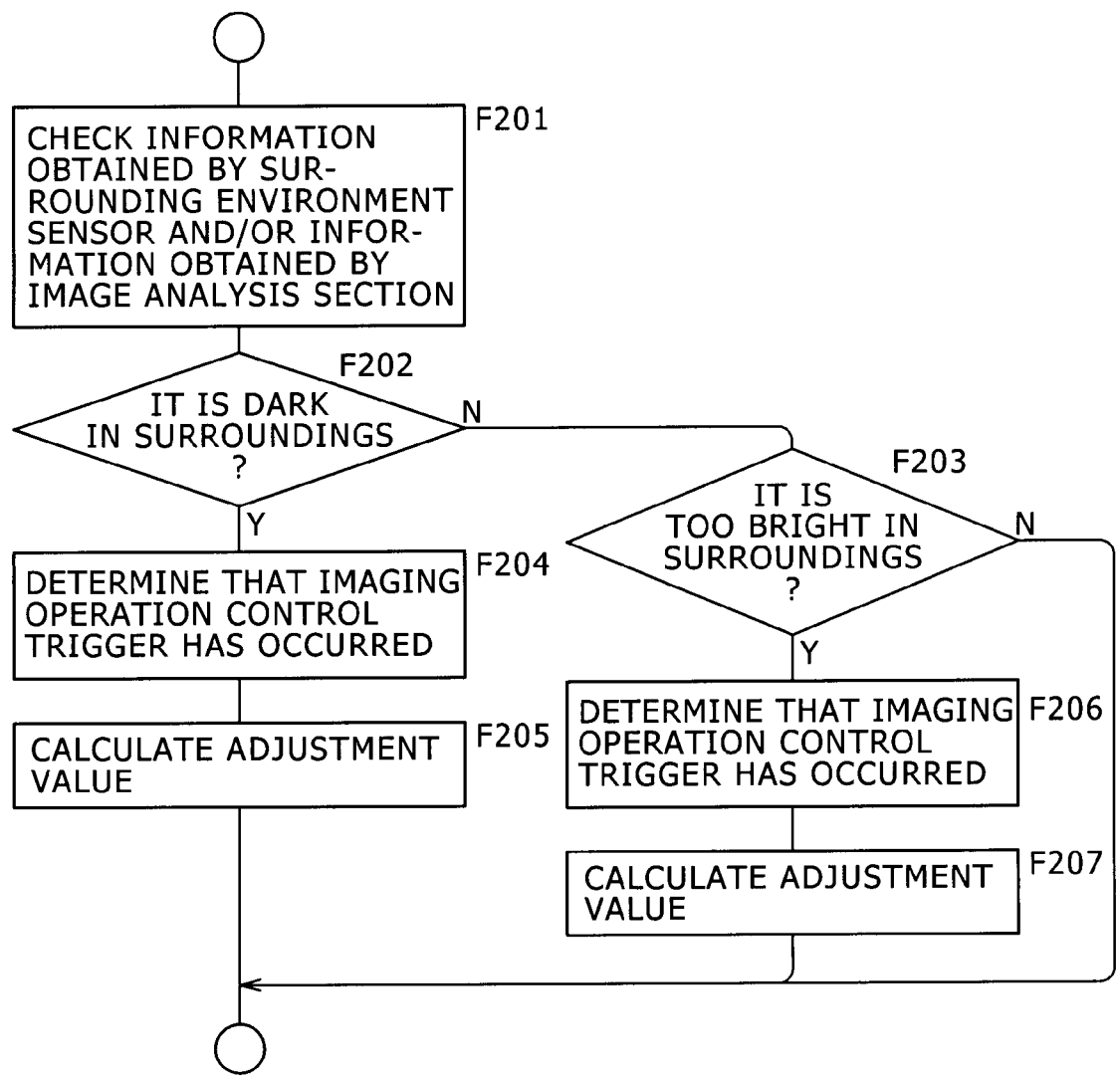

First, FIG. 15 illustrates an exemplary procedure for determining the occurrence of the imaging operation control trigger based on the information obtained from the surrounding environment sensor 19 or the information obtained from the image analysis section 17.

At step F201 in FIG. 15, the system controller 10 monitors one or both of the information obtained by the surrounding environment sensor 19 and the information obtained by the image analysis section 17. It is assumed here that the surrounding environment sensor 19 is the illumination sensor, and that the image analysis section 17 is performing a process of analyzing the image to determine the brightness of the surroundings.

Based on one or both of the information obtained from the surrounding environment sensor 19 and the information obtained from the image analysis section 17, the system controller 10 determines whether or not it is dark in the surroundings, or whether or not it is too bright in the surroundings. For example, detected illumination is converted into numerical form, and when the detected illumination is lower than x lux, the system controller 10 determines that it is dark in the surroundings, and when the detected illumination is higher than y lux, the system controller 10 determines that it is too bright in the surroundings.

When it is determined that it is dark in the surroundings, the system controller 10 proceeds from step F202 to step F204, and determines that the imaging operation control trigger has occurred.

Then, at step F205, the system controller 10 calculates an adjustment value in accordance with the current illumination (darkness) in the surroundings. For example, an adjustment value for display brightness, the contrast, the sharpness, the imaging sensitivity, or the like is calculated so that an appropriate photographed image can be obtained.

As a result of the processes of steps F204 and F205, control in the procedure of FIG. 12 performed by the system controller 10 proceeds from step F103 to step F105 (or control in the procedure of FIG. 14 proceeds from step F124 to step F128), and in this case, the system controller 10 issues an instruction to perform a process such as imaging sensitivity control in the imaging section 3, or brightness control, the contrast control, sharpness control, or the like in the imaging signal processing section 15. As a result of this process, the image quality of the photographed image is adjusted. In the case where it is dark in the surroundings and thus such an image as illustrated in FIG. 8A will be photographed, the system controller 10 switches the state of the imaging apparatus 1 (1A) to a state in which such an easy-to-see photographed image as illustrated in FIG. 8B can be obtained.

Note that when it has been determined that it is dark in the surroundings, the system controller 10 may control the illumination section 4 to provide illumination.

When it is determined that it is too bright in the surroundings, the system controller 10 proceeds from step F203 to step F206, and determines that the imaging operation control trigger has occurred.

Then, at step F207, the system controller 10 calculates an adjustment value in accordance with the current illumination in the surroundings. For example, an adjustment value for the display brightness, the contrast, the sharpness, the imaging sensitivity, or the like is calculated so that an appropriate photographed image can be obtained. Since it is too bright in the surroundings in this case, an adjustment value for decreasing the imaging sensitivity or decreasing the brightness is calculated, for example.

As a result of the processes of steps F206 and F207, control in the procedure of FIG. 12 performed by the system controller 10 proceeds from step F103 to step F105 (or control in the procedure of FIG. 14 proceeds from step F124 to step F128), and in this case also, the system controller 10 issues an instruction to perform a process such as the imaging sensitivity control in the imaging section 3, or the brightness control, the contrast control, the sharpness control, or the like in the imaging signal processing section 15. As a result of this process, the image quality of the photographed image is adjusted so that a photographed image with appropriate brightness can be obtained despite it being too bright in the surroundings.

Figure 16B:
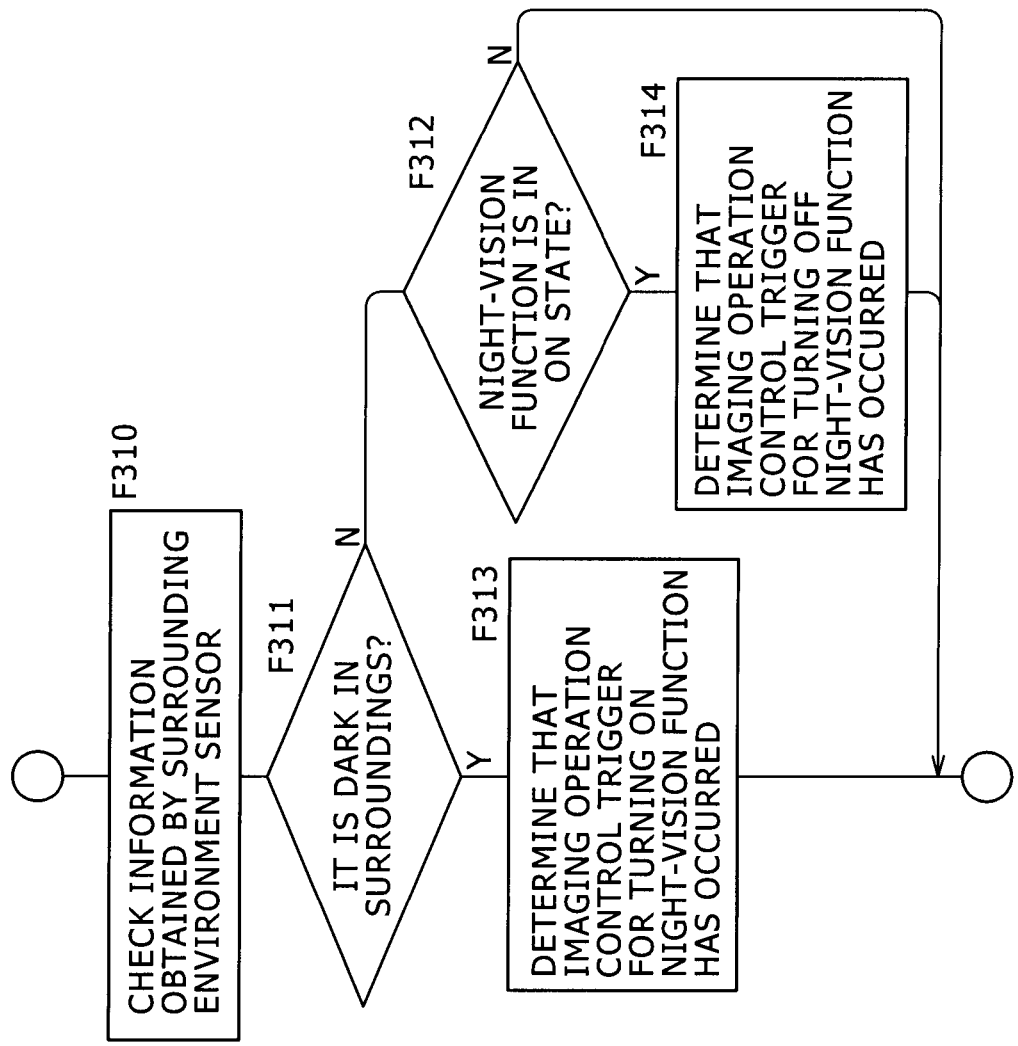
Figure 16A:
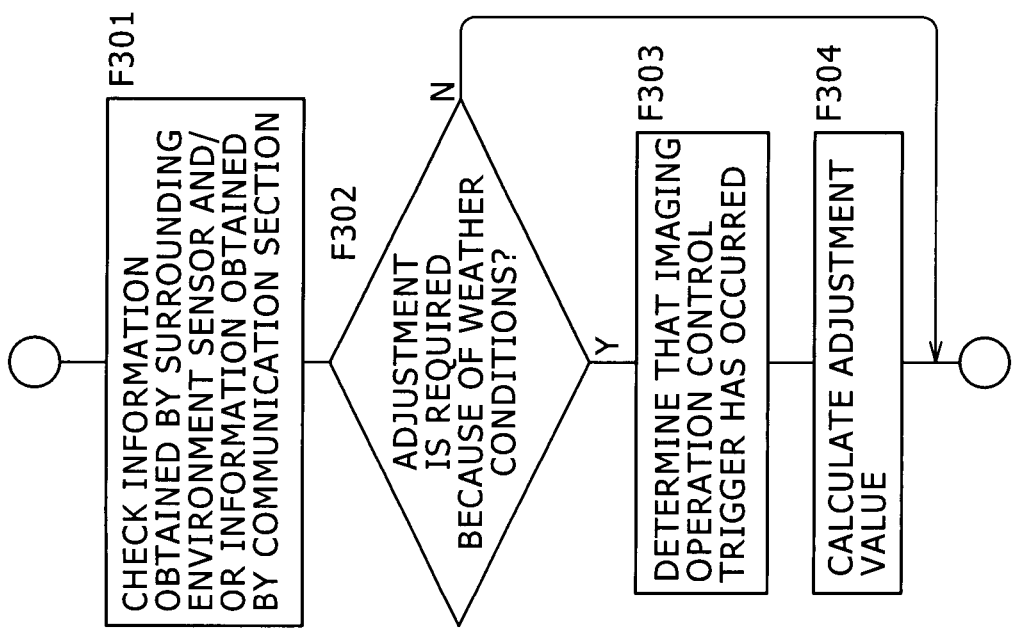

FIG. 16A illustrates an exemplary procedure for determining the occurrence of the imaging operation control trigger based on the information obtained from the surrounding environment sensor 19 or the information obtained from the communication section 26.

At step F301 in FIG. 16A, the system controller 10 monitors one or both of the information detected by the surrounding environment sensor 19 and the information received by the communication section 26. Examples of the surrounding environment sensor 19 include the temperature sensor, the humidity sensor, and the atmospheric pressure sensor. It is assumed here that the communication section 26 regularly receives the weather information from the network server or the like, for example.

The system controller 10 is able to determine the weather conditions of the surroundings based on the information of the atmospheric pressure, the humidity, and the temperature obtained by the surrounding environment sensor 19, for example. In addition, the system controller 10 is able to determine the weather conditions based on the weather information received by the communication section 26. Note that, in order to receive the information of the weather conditions from the network server, the system controller 10 may transmit the information of the current position obtained by the GPS receiver section 21 regularly to the network server to receive, from the network server, weather information of an area to which the current position belongs.

The system controller 10 is able to determine the weather conditions of the surroundings based on the information detected by the surrounding environment sensor 19 or the information received by the communication section 26, but use of both the information makes it possible to recognize the weather conditions more precisely.

At step F302, the system controller 10 determines whether image adjustment is required in accordance with the weather conditions, such as fine weather, cloudy weather, rainy weather, a thunderstorm, a typhoon, or a snowfall, or in accordance with a change in the weather conditions, such as start of rainfall, stopping of rainfall, or darkening of the sky. If it is determined that the image adjustment is required, the system controller 10 proceeds from step F302 to step F303, and determines that the imaging operation control trigger has occurred. Then, at step F304, the system controller 10 calculates an adjustment value in accordance with the current weather. For example, an adjustment value for the brightness, the contrast, the sharpness, the imaging sensitivity, or the like is calculated so that an appropriate or entertaining photographed image can be obtained.

As a result of the processes of steps F303 and F304, control in the procedure of FIG. 12 performed by the system controller 10 proceeds from step F103 to step F105 (or control in the procedure of FIG. 14 proceeds from step F124 to step F128), and in this case, the system controller 10 issues an instruction to perform a process such as the imaging sensitivity control in the imaging section 3, or the brightness control, the contrast control, the sharpness control, or the like in the imaging signal processing section 15. As a result of this process, the image quality of the photographed image is adjusted so as to be suited to the weather conditions. Examples of the image quality suited to the weather conditions include an image quality that makes the photographed image easy to see in accordance with the weather conditions, and an image quality that emphasizes the weather conditions.

Note that the system controller 10 may control the illumination section 4 to provide illumination depending on the weather.

Also note that although it has been assumed here that the weather is determined based on the information obtained by the surrounding environment sensor 19 or the information received by the communication section 26, recognition of a rain image by the image analysis section 17 allows accurate detection of the start or stop of rainfall, occurrence of lightening, or the like.

Next, with reference to FIG. 16B, an exemplary procedure for determining the occurrence of an imaging operation control trigger for turning on or off a night-vision function based on the information obtained from the surrounding environment sensor 19 will now be described below.

At step F310 in FIG. 16B, the system controller 10 monitors the information obtained by the surrounding environment sensor 19. It is assumed here that the surrounding environment sensor 19 is the illumination sensor.

Based on the information detected by the surrounding environment sensor 19, the system controller 10 determines whether it is dark in the surroundings. For example, the detected illumination is converted into numerical form, and when the detected illumination is lower than x lux, the system controller 10 determines that it is dark in the surroundings.

When it is determined that it is dark in the surroundings, the system controller 10 proceeds from step F311 to step F313, and determines that an imaging operation control trigger for turning on the night-vision function has occurred.

As a result of the process of step F313, control in the procedure of FIG. 12 performed by the system controller 10 proceeds from step F103 to step F105 (or control in the procedure of FIG. 14 proceeds from step F124 to step F128), and in this case, the system controller 10 performs control of turning on the night-vision function. That is, the system controller 10 instructs the imaging control section 11 to increase the infrared imaging sensitivity in the imaging section 3.

As a result of this process, the night-vision function is enabled, and when it is dark and the visibility is very low as illustrated in FIG. 9A, for example, it becomes possible to obtain the image as illustrated in FIG. 9B, photographed with increased infrared sensitivity.

Meanwhile, when it is determined that it is not dark in the surroundings, the system controller 10 proceeds from step F311 to step F312. In this case, if the night-vision function (for imaging with increased infrared sensitivity) is in an ON state at this time, the system controller 10 proceeds to step F314, and determines that an imaging operation control trigger for turning off the night-vision function has occurred. As a result of the process of step F314, control in the procedure of FIG. 12 performed by the system controller 10 proceeds from step F103 to step F105 (or control in the procedure of FIG. 14 proceeds from step F124 to step F128), and in this case, the system controller 10 performs control of turning off the night-vision function. That is, the system controller 10 instructs the imaging control section 11 to return the infrared imaging sensitivity in the imaging section 3 to normal so that the regular imaging operation will be performed.

According to the procedure of FIG. 16B, the night-vision function is automatically turned on when the user has entered a dark room, for example, so that an image with which the subject can be recognized despite the surrounding darkness can be photographed. In addition, when the user has gone out of the dark room, for example, the night-vision function is automatically turned off. That is, imaging control desirable for the user is achieved in accordance with the surrounding situation.

Note that the detection of whether it is dark in the surroundings can also be achieved by image analysis performed by the image analysis section 17. For example, it may be so arranged that when overall brightness of the photographed image has become very low, it is determined that it has become dark in the surroundings and that the imaging operation control trigger for turning on the night-vision function has occurred.

Figure 17:
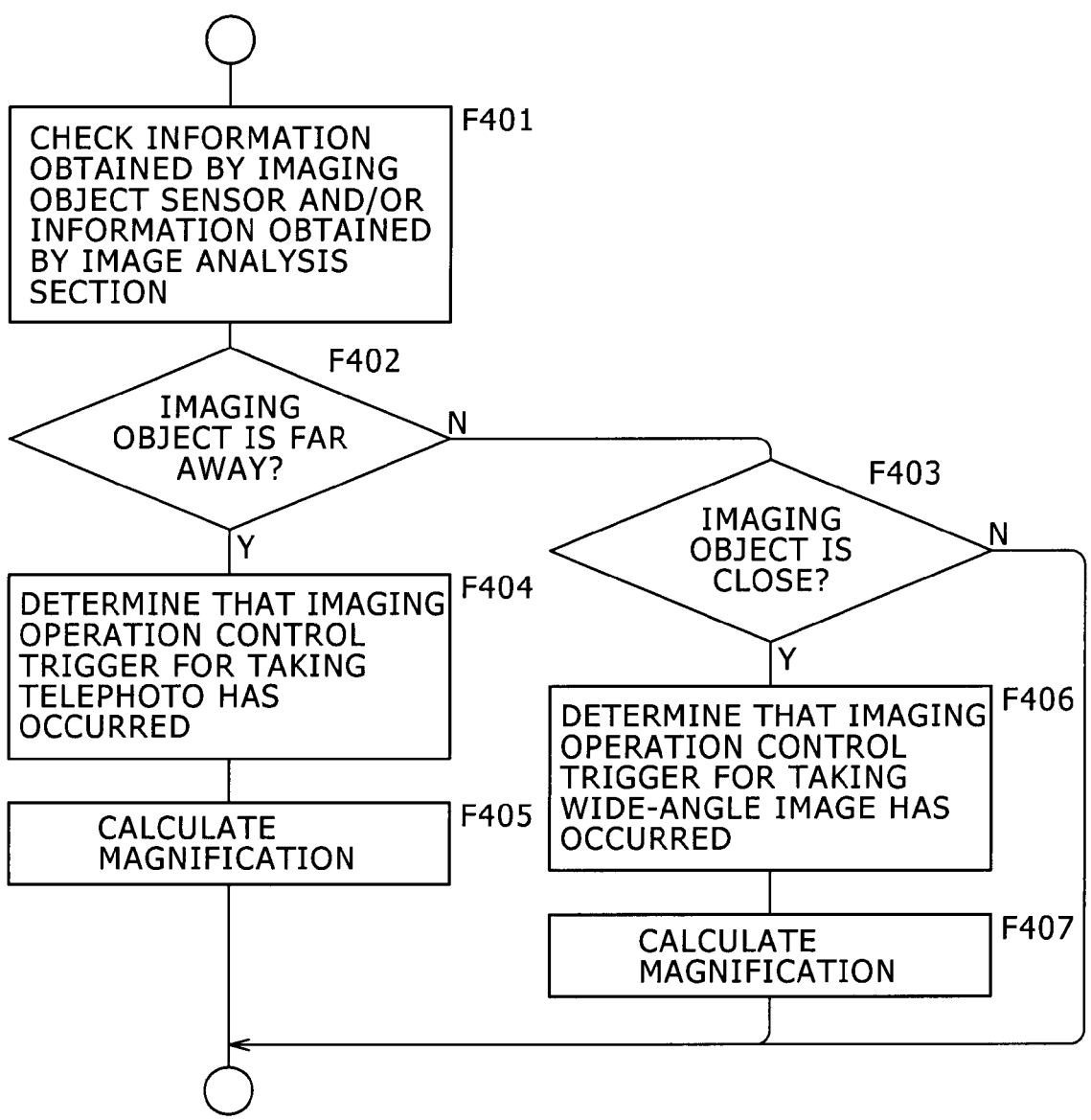

FIG. 17 illustrates an exemplary procedure for determining the occurrence of the imaging operation control trigger based on the information obtained from the imaging object sensor 20 or the information obtained from the image analysis section 17.

At step F401 in FIG. 17, the system controller 10 monitors one or both of the detected information obtained from the imaging object sensor 20 and the information obtained from the image analysis section 17. It is assumed here that the imaging object sensor 20 is the distance-measuring sensor, for example. Also, it is assumed here that the image analysis section 17 analyzes the photographed image to calculate the distance to the subject.

Based on such information, the system controller 10 determines whether or not an object (i.e., the imaging object) that the user is viewing is far away from the user, or whether or not the imaging object is close to the user, such as at hand.

When it is determined that the imaging object is far away from the user, such as when the user is watching a distant scene or when the user is watching a sport game in a seat in a rear part of a stadium, the system controller 10 proceeds from step F402 to step F404, and determines that an imaging operation control trigger for switching to a telephoto zoom mode has occurred. Then, at step F405, the system controller 10 calculates an appropriate zoom magnification in accordance with the distance to the imaging object at the time.

Meanwhile, when it is determined that the imaging object is close to the user, such as when the user is watching a nearby scene or when the user is reading the newspaper or the like at hand, the system controller 10 proceeds from step F403 to step F406, and determines that an imaging operation control trigger for switching to a zoom-in (wide-angle zoom) mode has occurred. Then, at step F407, the system controller 10 calculates an appropriate zoom magnification in accordance with the distance to the imaging object.

As a result of the processes of steps F404 and F405 or the processes of steps F406 and F407, control in the procedure of FIG. 12 performed by the system controller 10 proceeds from step F103 to step F105 (or control in the procedure of FIG. 14 proceeds from step F124 to step F128), and the system controller 10 instructs the imaging control section 11 to zoom in or out to the calculated magnification.

As a result, a telephoto image as illustrated in FIG. 5C or a wide-angle image as illustrated in FIG. 6B is photographed in the imaging section 3 in accordance with the scene that the user is attempting to view.

Note that although it has been assumed in the above exemplary procedure that telephoto/wide-angle zooming operation control is performed, it is also conceivable that control of adjusting a focal point or control of magnifying or reducing the image is performed in accordance with the distance to the imaging object.

Figure 18:
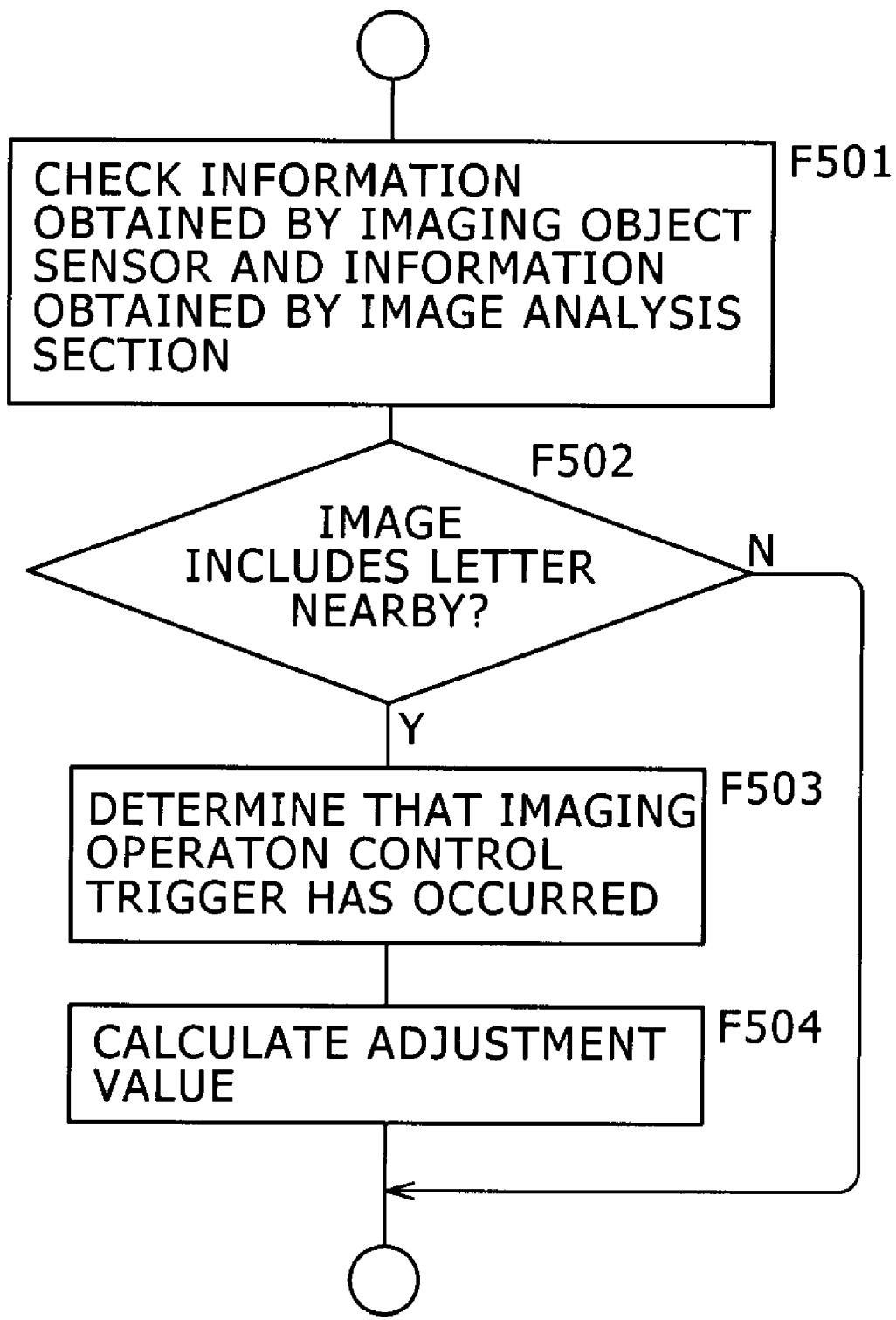

FIG. 18 illustrates an exemplary procedure for determining the occurrence of the imaging operation control trigger based on the information obtained from the imaging object sensor 20 and the information obtained from the image analysis section 17. In particular, in this exemplary procedure, it is determined whether the imaging object includes a letter such as a letter in a newspaper, a book, or the like.

At step F501 in FIG. 18, the system controller 10 monitors the detected information obtained from the imaging object sensor 20 and the information obtained from the image analysis section 17. It is assumed here that the imaging object sensor 20 is the distance-measuring sensor. In addition, it is assumed here that the image analysis section 17 analyzes the photographed image to detect whether the subject includes a letter.

Based on these pieces of information, the system controller 10 determines whether or not the object (i.e., the imaging object) that the user is viewing is an object that includes a letter, such as the newspaper, the book, or the like, and is close to the user. That is, the system controller 10 determines whether or not the user is reading the newspaper at hand or is in a similar situation.

When it is determined that the imaging object is close to the user and includes a letter, the system controller 10 proceeds from step F502 to step F503, and determines that the imaging operation control trigger has occurred.

Then, at step F504, the system controller 10 calculates an adjustment value that is suited to the case where the subject is the newspaper, the book, or the like. For example, an adjustment value for the brightness, the contrast, the sharpness, the imaging sensitivity, or the like is calculated so that the letter on the newspaper or the like can be imaged excellently.

As a result of the processes of steps F503 and F504, control in the procedure of FIG. 12 performed by the system controller 10 proceeds from step F103 to step F105 (or control in the procedure of FIG. 14 proceeds from step F124 to step F128), and in this case, the system controller 10 issues an instruction to perform a process such as the imaging sensitivity control in the imaging section 3, or the brightness control, the contrast control, the sharpness control, or the like in the imaging signal processing section 15. As a result of this process, the image quality of the photographed image is adjusted to an image quality suitable for showing the newspaper or the like, such as an image quality that allows the letter to be recognized clearly, for example.

Note that it may be so arranged that, in addition to detecting whether or not the photographed image includes a letter, the brightness of the surroundings is detected, and that the detected brightness of the surroundings is taken into account when calculating the adjustment value.

Also note that recognition of the shape of the book or newspaper in the image analysis may be added to a condition for proceeding to step F503.

Also note that when it has been determined that the imaging object is the newspaper or the like, the system controller 10 may control the illumination section 4 to provide illumination.

Also note that, instead of adjusting the image quality, the system controller 10 may control the imaging signal processing section 15 to perform the image magnification process to obtain a photographed image in which the letter is magnified, for example.

In the case where the image includes a letter, the image analysis section 17 may identify the letter and supply the letter to the system controller 10 as text data. In the case of the structure as illustrated in FIGS. 1 and 3, for example, the system controller 10 may control the speech synthesis section 29 to perform a speech synthesis process based on the text data detected from the image.

As a result, the audio signal for the read speech reading the letter included in the photographed image is generated in the speech synthesis section 29. The system controller 10 allows the read speech to be outputted via the audio output section 5.

This enables the user to listen to the read speech only by viewing the newspaper or the like.

Figure 19:
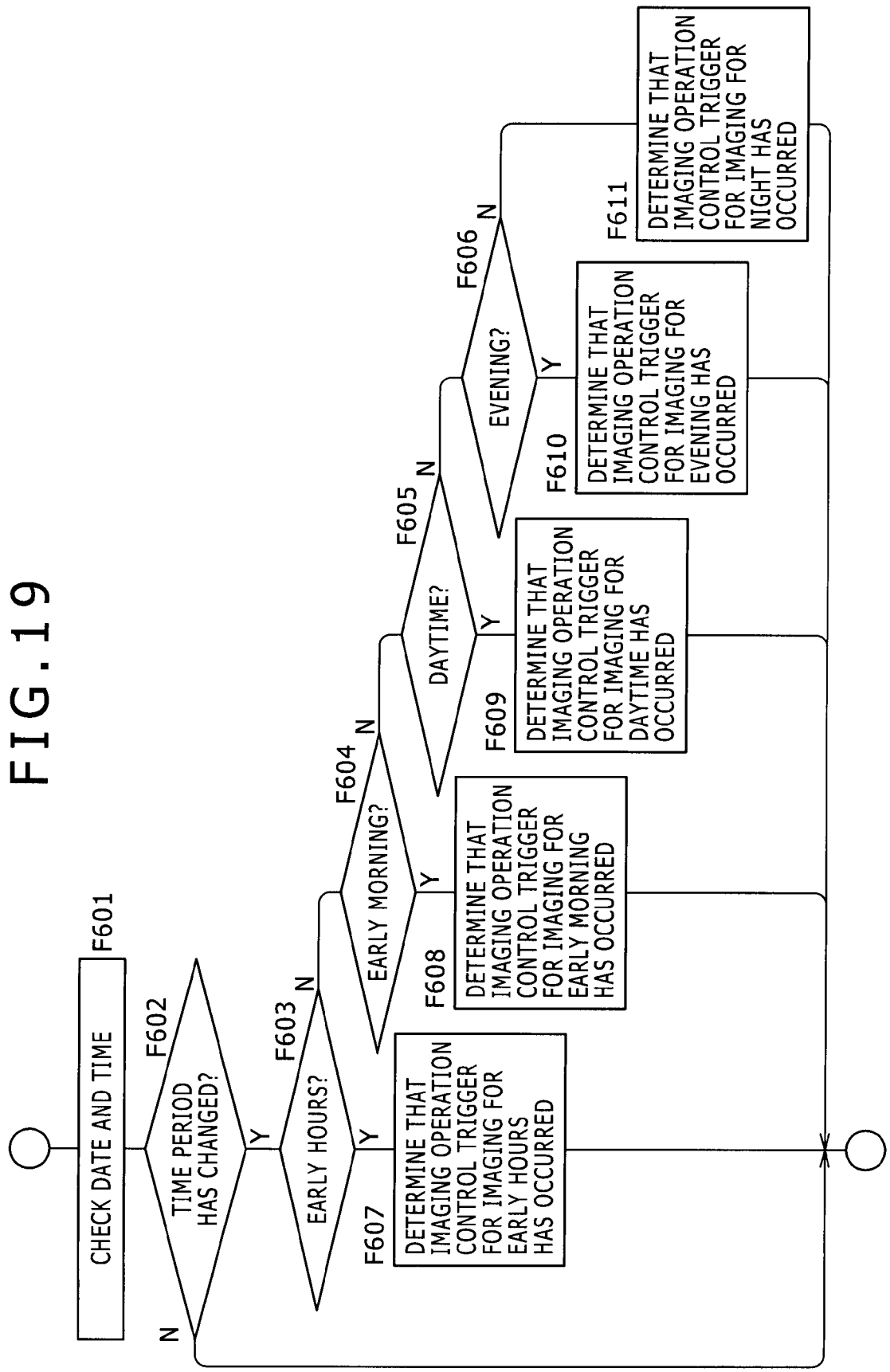

FIG. 19 illustrates an exemplary procedure for determining the occurrence of the imaging operation control trigger based on the information of the current time obtained by the date/time calculation section 22

At step F601 in FIG. 19, the system controller 10 checks the current date and time calculated by the date/time calculation section 22. Based on the current time, the system controller 10 determines a time period within which the current time falls. Examples of the time period include early hours, early morning, daytime, evening, and night. For example, the early hours are assumed to range from 4 to 7, the early morning from 7 to 9, the daytime from 9 to 17, the evening from 17 to 19, and the night from 19 to 4.

Note that a criterion for separating the time into the time periods may be changed depending on the month and day. For example, considering that sunrise and sunset differ depending on the month and day, a time range of any of the above time periods may be changed. For example, the time period "early hours" may be determined to range from 4 to 7 in summer, and from 6 to 8 in winter.

At step F602, the system controller 10 determines whether the time period of the current date and time has changed, based on the time period of the current time determined by the date and time check performed at step F601. If it is determined at step F602 that the time period of the current date and time has changed, the system controller 10 proceeds to step F603 and subsequent steps.

For example, when the current time falls within the early hours, the system controller 10 proceeds from step F603 to step F607, and determines that an imaging operation control trigger for an imaging/display operation for the early hours has occurred.

When the current time falls within the early morning, the system controller 10 proceeds from step F604 to step F608, and determines that an imaging operation control trigger for an imaging/display operation for the early morning has occurred.

When the current time falls within the daytime, the system controller 10 proceeds from step F605 to step F609, and determines that an imaging operation control trigger for an imaging/display operation for the daytime has occurred.

When the current time falls within the evening, the system controller 10 proceeds from step F606 to step F610, and determines that an imaging operation control trigger for an imaging/display operation for the evening has occurred.

When the current time falls within the night, the system controller 10 proceeds to step F611, and determines that an imaging operation control trigger for an imaging/display operation for the night has occurred.

If it is determined at any of steps F607, F608, F609, F610, and F611 that the imaging operation control trigger has occurred, control in the procedure of FIG. 12 performed by the system controller 10 proceeds from step F103 to step F105 (or control in the procedure of FIG. 14 proceeds from step F124 to step F128), and the system controller 10 instructs the imaging control section 11 and the display control section 14 to perform the imaging operation in accordance with the current time period. For example, the system controller 10 issues an instruction to perform a process such as the imaging sensitivity control, the brightness control, the contrast control, the sharpness control, or the like. Further, the system controller 10 may issue an instruction to apply an image effect, such as soft focus, to the photographed image.

As a result of this process, a photographed image that gives an impression suited to the current time period is obtained. For example, an image having a soft image quality is obtained in the early hours, a sharp high-contrast image is obtained in the daytime, an image having a sepia-toned image quality is obtained in the evening, and an image having a drab image quality is obtained at night. Thus, entertaining photographed images that match moods of the user in the respective time periods can be obtained.

Needless to say, image quality control of adjusting the image quality in accordance with the brightness of the current time period in order to improve visibility in the photographed image is also conceivable.

Further, in addition to the time period, the weather conditions and whether the user is currently indoors or outdoors may be determined to adjust the image quality appropriately in accordance with such conditions.

Still further, it may be so arranged that the season, instead of the time period, is determined based on the information of the date and time, and that the image quality is adjusted in accordance with the season. For example, photographed images with a sense of the season can be obtained by enhancing blue components in summer, red components in fall, white components in winter, and green/pink or similar colors in spring, for example.

Figure 20B:
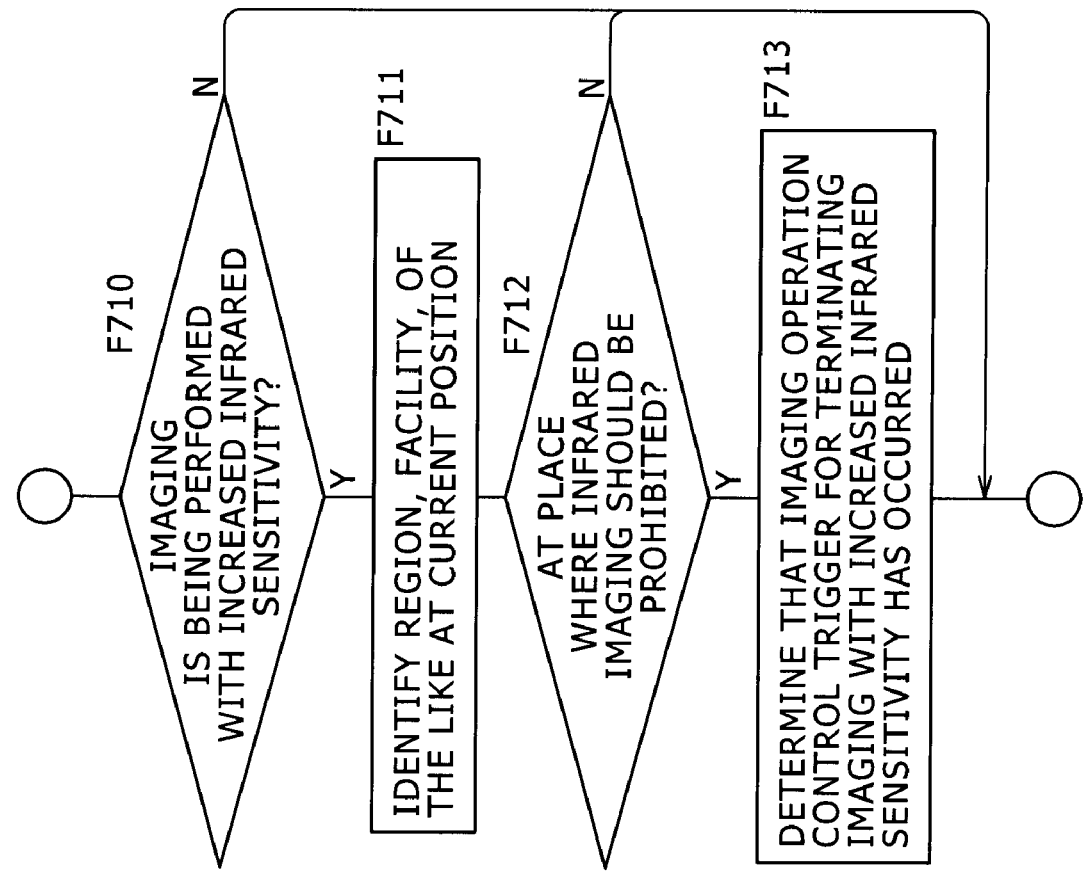
Figure 20A:
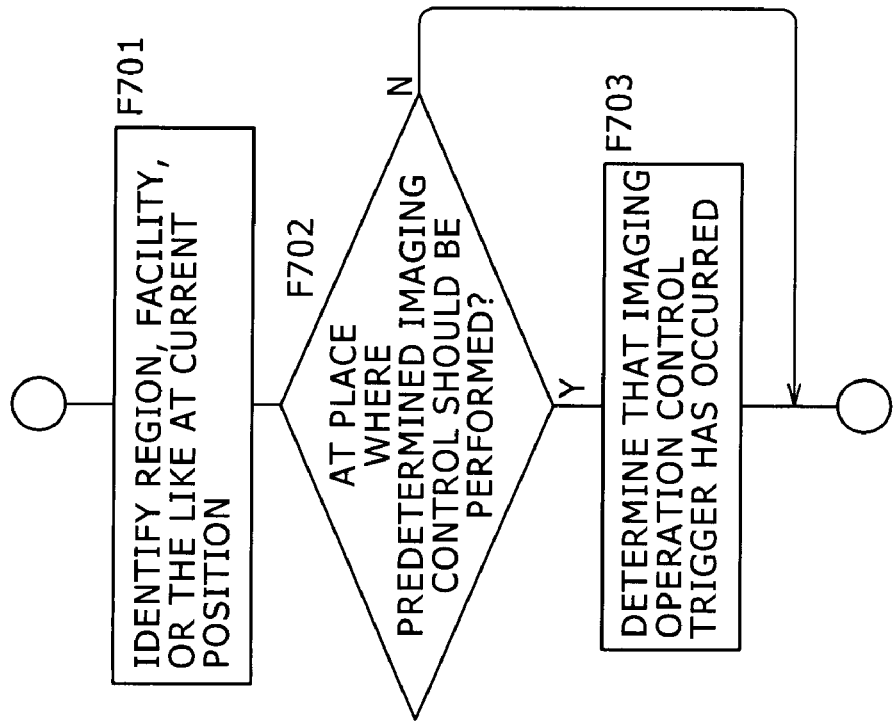

FIG. 20A illustrates an exemplary procedure for determining the occurrence of the imaging operation control trigger based on the information received by the GPS receiver section 21 and the information received by the communication section 26.

At step F701 in FIG. 20A, the system controller 10 transmits the information of the latitude and longitude of the current position obtained by the GPS receiver section 21 to the network server or the device that contains the map database via the communication section 26, and receives information concerning the current position retrieved in the network server or the device that contains the map database. Note that in the case where the imaging apparatus 1 contains the map database, the system controller 10 is able to retrieve information concerning the current position from this map database based on the information of the latitude and longitude of the current position obtained from the GPS receiver section 21.

At step F702, based on the acquired information concerning the current position, the system controller 10 determines whether the user is currently at a place where predetermined imaging control should be performed. If it is determined that the current position is at a place where the predetermined imaging control should be performed, the system controller 10 proceeds from step F702 to step F703, and determines that an imaging operation control trigger for performing the predetermined imaging control has occurred.

As a result of it being determined at step F703 that the imaging operation control trigger has occurred, control in the procedure of FIG. 12 performed by the system controller 10 proceeds from step F103 to step F105 (or control in the procedure of FIG. 14 proceeds from step F124 to step F128), and the system controller 10 instructs the imaging control section 11 to perform a predetermined imaging operation.

Examples of control of the imaging operation to be performed in this case are as follows.

In the case where the current position is at a sports ground, a racing circuit, or the like, an object (i.e., the imaging object) that the user will view is a person, a car, or the like that moves quickly, and therefore, the system controller 10 controls the imaging control section 11 to increase the imaging frame rate to handle the quick motion in photographing.

In the case where the current position is at the concert hall, a vaudeville theater, an entertainment hall, the sports ground, or the like, the system controller 10 may instruct the imaging control section 11 to perform a telephoto imaging operation in accordance with the distance to a stage that is the imaging object. In the case where the distance to the imaging object, such as the stage, can also be determined as the information concerning the current position, it is possible to set the magnification in accordance with the distance to the imaging object. The distance to the imaging object can be detected by the imaging object sensor 20 (i.e., the distance-measuring sensor). Note that, instead of issuing an instruction to perform a telephoto operation, the system controller 10 may instruct the imaging signal processing section 15 to perform the image magnification process.

In the case where the current position is at the seashore, the mountain, or the like, the system controller 10 may instruct the imaging control section 11 to photograph with increased ultraviolet imaging sensitivity to obtain an image in which the amount of ultraviolet rays is represented as illustrated in FIG. 10B, for example.

Further, based on the acquired information concerning the current position, a character image or a letter that represents a place name, the name of the facility, the store, or the like which is being photographed, or the like may be superimposed on the photographed image. It is also conceivable that the system controller 10 performs control such that advertising information, the guide information of the facility, alarm information concerning a surrounding area, or the like is superimposed on the photographed image. This is possible when the imaging signal processing section 15 has a capability for generating or synthesizing character images or letters, for example.

FIG. 20B also illustrates an exemplary procedure for determining the occurrence of the imaging operation control trigger based on the information received by the GPS receiver section 21 and the information received by the communication section 26. In particular, this exemplary procedure is performed when imaging is being performed with increased infrared sensitivity.

In the procedure of FIG. 20B, control proceeds from step F710 to step F711 when the imaging section 3 is currently performing imaging with increased infrared sensitivity.

At step F711, the system controller 10 transmits the information of the latitude and longitude of the current position obtained by the GPS receiver section 21 to the network server or the device that contains the map database via the communication section 26, and receives the information concerning the current position retrieved in the network server or the device that contains the map database. Note that in the case where the imaging apparatus 1 contains the map database, the system controller 10 is able to retrieve the information concerning the current position from this map database based on the information of the latitude and longitude of the current position obtained from the GPS receiver section 21.

After acquiring the information concerning the current position, the system controller 10 determines whether the current position is at a place where imaging with increased infrared sensitivity should be prohibited.

If it is determined that the current position is at a place where imaging with increased infrared sensitivity should be prohibited, the system controller 10 proceeds from step F712 to step F713, and determines that an imaging operation control trigger for terminating the imaging with increased infrared sensitivity has occurred.

As a result of it being determined at step F713 that the imaging operation control trigger has occurred, control in the procedure of FIG. 12 performed by the system controller 10 proceeds from step F103 to step F105 (or control in the procedure of FIG. 14 proceeds from step F124 to step F128), and the system controller 10 instructs the imaging control section 11 to terminate the imaging with increased infrared sensitivity.

Since the imaging with increased infrared sensitivity can be prohibited depending on the place as described above, it is possible to prevent improper use of a special imaging feature such as a feature of imaging with increased infrared sensitivity.

FIG. 21A illustrates an exemplary procedure for determining the occurrence of the imaging operation control trigger based on the information obtained from the image analysis section 17.

At step F801 in FIG. 21A, the system controller 10 monitors the information obtained from the image analysis section 17. It is assumed here that the image analysis section 17 analyzes the photographed image to determine whether the subject includes a specified object.

When, as a result of the image analysis, it is determined that the photographed image includes the specified object, the system controller 10 proceeds from step F802 to step F803, and determines that the imaging operation control trigger has occurred.

As a result of it being determined at step F803 that the imaging operation control trigger has occurred, control in the procedure of FIG. 12 performed by the system controller 10 proceeds from step F103 to step F105 (or control in the procedure of FIG. 14 proceeds from step F124 to step F128), and the system controller 10 instructs the imaging control section 11 to perform predetermined image processing.

Conceivable examples of image processing control performed in this case are as follows.

In the case where the specified object is a bird, for example, if a bird is detected in the photographed image, the system controller 10 may instruct the imaging signal processing section 15 to apply an image effect to the photographed image so that the bird is highlighted in the photographed image as illustrated in FIG. 11C. As a result of this type of process, an image photographed by the user during hiking, for example, can be changed to an image that, when reproduced subsequently, allows the user to find the specified object, such as the bird, easily.

Suppose that the specified object is a cat. The user, who likes cats, may see a cat enter his or her field of vision in his or her daily life. When this happens, photographing will be performed such that the cat is highlighted in the photographed image. Thus, when the photographed image is reproduced subsequently, the user can recognize the cat therein easily.

In the case where the specified object is a person, if the person is detected in the photographed image, the system controller 10 may instruct the imaging signal processing section 15 or the imaging section 3 to operate so that the person will stand out in the image by highlighting the person or magnifying or zooming in on the person, for example.

In the case where the specified object is a person, an animal, a structure, or the like, the system controller 10 may perform control such that a photographed image in which only the specified object is shown while a scene surrounding the specified object such as the person is blotted out entirely will be obtained.

Conversely, it is also conceivable that when a person is detected as the specified object, the photographed image is processed so that only the person is blotted out in the image. For example, an image of a natural scene in which an artificial object such as a person, a car, or the like is excluded (masked) may be obtained. In this case, an interpolation process may be performed so that pixels corresponding to the specified object will be filled in using pixels that surround the specified object that is to be masked.

In the case where the specified object is a person or the like, it is also conceivable that an image effect, such as mosaicing, is applied to the photographed image.

Note that it has been assumed in the procedure of FIG. 21A that the determination of the occurrence of the imaging operation control trigger is made based on the information obtained from the image analysis section 17. However, in the case where the specified object is a living body such as a person or an animal, it may be so arranged that the occurrence of the imaging operation control trigger is determined when the pyroelectric sensor as the imaging object sensor 20 has detected the specified object.

FIG. 21B also illustrates an exemplary procedure for determining the occurrence of the imaging operation control trigger based on the information obtained from the image analysis section 17.

At step F810 in FIG. 21B, the system controller 10 monitors the information obtained from the image analysis section 17. The image analysis section 17 analyzes the photographed image to determine whether a quick motion is occurring in the subject. For example, the speed of a motion can be determined based on differences between frames photographed.

When, as a result of the image analysis, a quick motion of the subject is detected, the system controller 10 proceeds from step F811 to step F812, and determines that the imaging operation control trigger has occurred.

As a result of it being determined at step F812 that the imaging operation control trigger has occurred, control in the procedure of FIG. 12 performed by the system controller 10 proceeds from step F103 to step F105 (or control in the procedure of FIG. 14 proceeds from step F124 to step F128). In this case, the system controller 10 instructs the imaging control section 11 to switch to a mode of photographing with a high frame rate.

This process makes it possible, in the case where the subject makes a quick motion frequently such as when the user is watching a sport game, for example, to photograph the quick motion successfully.

Note that it has been assumed here that the detection of the quick motion of the imaging object is a trigger for switching to a high frame rate. However, the detection thereof may be a trigger for zooming in on or highlighting the imaging object that moves quickly.

Figure 22A:
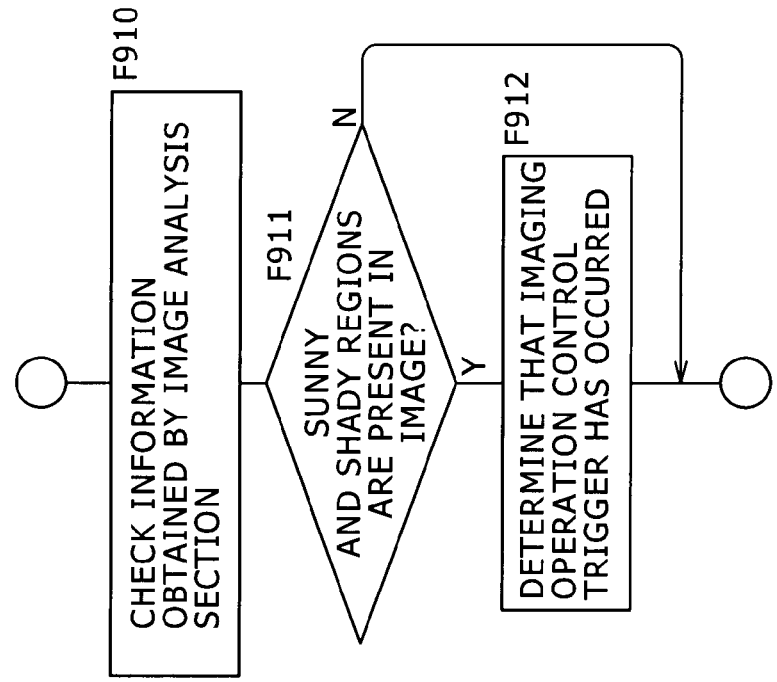

FIG. 22A also illustrates an exemplary procedure for determining the occurrence of the imaging operation control trigger based on the information obtained from the image analysis section 17. More particularly, in this exemplary procedure, when a person has been photographed, that person is identified.

At step F901 in FIG. 22A, the system controller 10 monitors the information obtained from the image analysis section 17. The image analysis section 17 analyzes the photographed image to determine whether the subject includes the face of a person, and, if the subject includes the face of a person, generates the personal characteristic data of this person from an image of the face. As noted previously, examples of the personal characteristic data include the ratio (Ed/EN) of the distance Ed between the eyes to the distance EN between the center of the eye and the nose, and the ratio (Ed/EM) of the distance Ed between the eyes to the distance EM between the center of the eye and the mouth.

If the personal characteristic data is extracted, the system controller 10 proceeds from step F902 to step F903, and searches for personal information based on the personal characteristic data.

For example, the system controller 10 transmits the personal characteristic data to the network server or the device that contains the people database via the communication section 26, and receives a result of search performed in the network server or the device that contains the people database for the personal information. In the case where the imaging apparatus 1 contains the people database, the system controller 10 is able to search this people database based on the personal characteristic data.

If the personal information of this particular person is found as a result of the search performed by the external device or the system controller 10 itself, the system controller 10 proceeds from step F904 to step F905, and determines that imaging operation control trigger has occurred.

As a result of it being determined at step F905 that the imaging operation control trigger has occurred, control in the procedure of FIG. 12 performed by the system controller 10 proceeds from step F103 to step F105 (or control in the procedure of FIG. 14 proceeds from step F124 to step F128), and the system controller 10 instructs the imaging control section 11 to photograph such that this person will be emphasized in the photographed image, for example. The photographed image may be subjected to a zooming process, the highlighting process, or the like. Further, a process of superimposing a letter representing the found personal information on the photographed image may be performed, for example.

While walking outside, for example, the user may encounter a person whom the user met in the past or a celebrity or the like who is registered in the people database. When this happens, as a result of the above processes, a photographed image in which the person, celebrity, or the like is emphasized or a photographed image to which a comment concerning the person or celebrity (i.e., information registered in the people database, such as the name or position of the person or celebrity, a place at which the user met the person, or the like) is added in the form of a letter will be obtained.

Figure 22B:
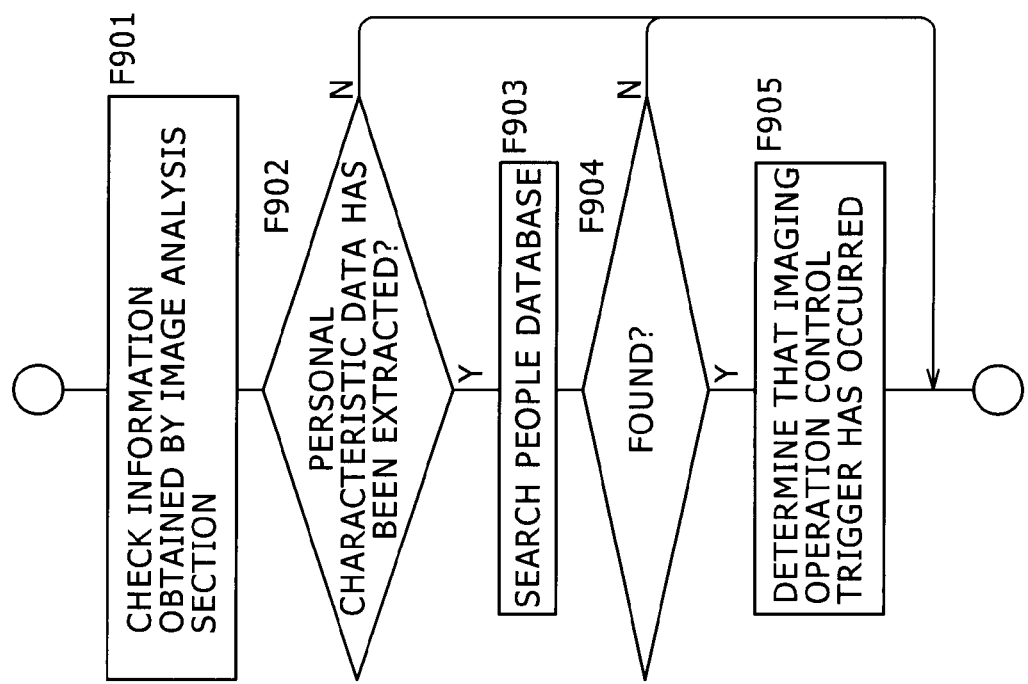

FIG. 22B also illustrates an exemplary procedure for determining the occurrence of the imaging operation control trigger based on the information obtained from the image analysis section 17. This exemplary procedure corresponds to the case where the image is hard to see because of the influence of the sunny and shady regions as illustrated in FIG. 11A.

At step F910 in FIG. 22B, the system controller 10 monitors the information obtained from the image analysis section 17. The image analysis section 17 analyzes the photographed image to determine whether bright and dark regions are present in the photographed image because of sunlight.

When, as a result of the image analysis, it is determined that brightness variations are occurring in the image because of the presence of the sunny and shady regions, the system controller 10 proceeds from step F911 to step F912, and determines that the imaging operation control trigger has occurred.

As a result of it being determined at step F912 that the imaging operation control trigger has occurred, control in the procedure of FIG. 12 performed by the system controller 10 proceeds from step F103 to step F105 (or control in the procedure of FIG. 14 proceeds from step F124 to step F128), and the system controller 10 instructs the imaging control section 11 to perform image processing for eliminating the brightness variations caused by the sunny and shady regions, or make a partial change to the imaging sensitivity. As a result of this process, a photographed image that is easy to see and which is not influenced by the sunny and shady regions significantly can be obtained as illustrated in FIG. 11B, for example.

It is also conceivable that, in the case where the influence of a lamp in a house or a facility, for example, instead of the influence of the sunlight, causes significant partial brightness variations to occur in the image or makes the image partially unclear, the system controller 10 issues an instruction to perform the brightness control, the imaging sensitivity control, the contrast control, or the like with respect to a part of the image.

Although the procedures of FIGS. 15 to 22B have been described as exemplary procedures for determining the occurrence of the imaging operation control trigger at step F103 in FIG. 12 (or step F124 in FIG. 14), these exemplary procedures can also be applied to the determination of the occurrence of the imaging start trigger (F101, F110, and F120), the imaging termination trigger (F104, F114, and F125), the recording start trigger (F112 and F122), the recording termination trigger (F113 and F123), the transmission start trigger (F112 and F122), and the transmission termination trigger (F113 and F123) at FIGS. 12, 13, and 14.

First, the determination of the occurrence of the imaging start trigger will now be described below.

For example, the system controller 10 may determine that the imaging start trigger has occurred when it has been determined via the surrounding environment sensor 19 that it is dark or too bright in the surroundings as in the exemplary procedure of FIG. 15, and then proceed to step F102 in FIG. 12 (or step F111 in FIG. 13 or step F121 in FIG. 14) to perform the imaging start control.

Also, the system controller 10 may determine that the imaging start trigger has occurred when it has been determined that adjustment is required because of the weather as in the procedure of FIG. 16A, and then perform the imaging start control. In this case, imaging is started when the weather is in a specified condition.

Also, the system controller 10 may determine that the imaging start trigger has occurred when it has been determined that it is dark in the surroundings as in the procedure of FIG. 16B, and then perform the imaging start control.

Also, the system controller 10 may determine that the imaging start trigger has occurred when it has been determined that the imaging object is far away from or close to the user as in the procedure of FIG. 17, and then perform the imaging start control.

Also, the system controller 10 may determine that the imaging start trigger has occurred based on the time period as in the procedure of FIG. 19, and then perform the imaging start control. Needless to say, the system controller 10 may determine that the imaging start trigger has occurred based on the month and day or the season.

Also, the system controller 10 may determine that the imaging start trigger has occurred when the current position has reached a predetermined place as in the procedure of FIG. 20A, and then perform the imaging start control. In this case, it is possible to start imaging at a specified place or based on the type of the facility at the current position.

Note that, because the image analysis section 17 is unable to detect the outside world situation before imaging is started, the occurrence of the imaging start trigger is determined based on the information obtained by the surrounding environment sensor 19, the imaging object sensor 20, the GPS receiver section 21, the date/time calculation section 22, or the communication section 26.

Next, examples of how the occurrence of the imaging termination trigger is determined will now be described below.

For example, in the exemplary procedure of FIG. 15, it is detected that it is dark or too bright in the surroundings. The system controller 10 may determine that the imaging termination trigger has occurred when it has become neither dark nor too bright in the surroundings, and then proceed to step F106 in FIG. 12 (or step F117 in FIG. 13 or step F129 in FIG. 14) to perform the imaging termination control.

In the procedure of FIG. 16A, it is determined whether adjustment is required because of the weather. The system controller 10 may determine that the imaging termination trigger has occurred when it has been determined that adjustment is not required, and then perform the imaging termination control.

In the case where it is determined whether or not it is dark in the surroundings as in the procedure of FIG. 16B, the system controller 10 may determine that the imaging termination trigger has occurred when it has become not dark in the surroundings, and then perform the imaging termination control.

In the case where it is determined whether the imaging object is far away from or close to the user as in the procedure of FIG. 17, the system controller 10 may determine that the imaging termination trigger has occurred when it has been determined that the imaging object is neither far away from nor close to the user, and then perform the imaging termination control.

In the case where the image including a letter nearby is detected as in the procedure of FIG. 18, the system controller 10 may determine that the imaging termination trigger has occurred when such an image has ceased to be detected, and then perform the imaging termination control.

The system controller 10 may determine that the imaging termination trigger has occurred based on the time period, the month and day, the season, or the like as in the procedure of FIG. 19, and then perform the imaging termination control.

The system controller 10 may determine that the imaging termination trigger has occurred when the current position has reached the predetermined place as in the procedure of FIG. 20A, and then perform the imaging termination control. In this case, it is possible to disable the imaging function at the specified place or based on the type of the facility at the current position. For example, an operation of not permitting imaging at a place where photographing is prohibited as in the concert hall, a museum, or the like can be achieved.

In the case where imaging with increased infrared sensitivity is stopped as in the procedure of FIG. 20B, the system controller 10 may determine at step F713 that the imaging termination trigger has occurred, and then perform the imaging termination control.

The system controller 10 may determine that the imaging termination trigger has occurred when it has been determined that the photographed image includes the specified object as in the procedure of FIG. 21A, and then perform the imaging termination control. In this case, an operation of prohibiting the imaging of the specified object can be achieved, for example.

Also, the system controller 10 may determine that the imaging termination trigger has occurred when it has been determined that the photographed image does not include the specified object, and then perform the imaging termination control.

In the case where the quick motion of the imaging object is being detected as in the procedure of FIG. 21B, the system controller 10 may determine that the imaging termination trigger has occurred when the quick motion has ceased to be detected, and then perform the imaging termination control.

The system controller 10 may determine that the imaging termination trigger has occurred when a specified person has been detected as in the procedure of FIG. 22A, and then perform the imaging termination control. In this case, an operation of prohibiting imaging of the specified person can be achieved.

Also, the system controller 10 may determine that the imaging termination trigger has occurred when it has been determined that the specified person has ceased to be present in the photographed image, and then perform the imaging termination control.

In the case where distribution of brightness variation in the image is being detected as in the procedure of FIG. 22B, the system controller 10 may determine that the imaging termination trigger has occurred when the brightness variations have been eliminated from the imaging object, and then perform the imaging termination control.

As described above, the system controller 10 may determine the occurrence of the imaging termination trigger and then perform the imaging termination control. This makes it possible to automatically terminate the imaging operation when the necessity of photographing for the user has been reduced or eliminated, or when photographing should be prohibited.

Next, examples of how the occurrence of the recording start trigger is determined will now be described below.

For example, the system controller 10 may determine that the recording start trigger has occurred when it has been detected via the surrounding environment sensor 19 that it is dark or too bright in the surroundings as in the exemplary procedure of FIG. 15, and then proceed to step F115 in FIG. 13 (or step F126 in FIG. 14) to perform the recording start control of controlling the storage section 25 to record the photographed image.

In the case where the weather is being detected as in the procedure of FIG. 16A, the system controller 10 may determine that the recording start trigger has occurred based on the weather, and then perform the recording start control of controlling the storage section 25 to record the photographed image. In this case, an operation of starting recording when the weather has cleared up, an operation of starting recording when a thunderstorm has occurred, and so on can be achieved, for example.

The system controller 10 may determine that the recording start trigger has occurred when it has been determined that it is dark in the surroundings as in the procedure of FIG. 16B, and then perform the recording start control of controlling the storage section 25 to record the photographed image.

The system controller 10 may determine that the recording start trigger has occurred when it has been determined that the imaging object is far away from or close to the user as in the procedure of FIG. 17, and then perform the recording start control of controlling the storage section 25 to record the photographed image.

The system controller 10 may determine that the recording start trigger has occurred when the image including a letter nearby has been detected as in the procedure of FIG. 18, and then perform the recording start control of controlling the storage section 25 to record the photographed image.

In addition, in the case where the letter has been detected by the image analysis section 17, the image analysis section 17 may supply the detected letter to the system controller 10 as the text data, and the system controller 10 may transfer the text data to the storage section 25 to be recorded therein. When encoding the photographed image data for recording, the storage section 25 may add the text data to the photographed image data as metadata so that the text data can be recorded together with the photographed image data. Alternatively, the storage section 25 may record the text data on the storage medium as an independent file.

In the case where the time period is determined as in the procedure of FIG. 19, the system controller 10 may determine that the recording start trigger has occurred based on the time period, and then perform the recording start control of controlling the storage section 25 to record the photographed image. In this case, an operation of starting recording in a specified time period can be achieved. Needless to say, the system controller 10 may determine that the recording start trigger has occurred based on the month and day, the season, or the like.

The system controller 10 may determine that the recording start trigger has occurred when the current position has reached the predetermined place as in the procedure of FIG. 20A, and then perform the recording start control of controlling the storage section 25 to record the photographed image. In this case, an operation of starting recording the photographed image at the specified place or based on the type of the facility at the current position can be achieved.

The system controller 10 may determine that the recording start trigger has occurred when it has been determined that the photographed image includes the specified object as in the procedure of FIG. 21A, and then perform the recording start control of controlling the storage section 25 to record the photographed image. In this case, an operation of recording the photographed image concerning the specified object can be achieved.

The system controller 10 may determine that the recording start trigger has occurred when the quick motion of the imaging object has been detected as in the procedure of FIG. 21B, and then perform the recording start control of controlling the storage section 25 to record the photographed image. This enables recording of the quick motion and subsequent reproduction thereof.

The system controller 10 may determine that the recording start trigger has occurred when the specified person has been detected as in the procedure of FIG. 22A, and then perform the recording start control of controlling the storage section 25 to record the photographed image. In this case, an operation of recording the photographed image concerning the specified person can be achieved.

The system controller 10 may determine that the recording start trigger has occurred when the brightness variations has been detected in the image as in the procedure of FIG. 22B, and then perform the recording start control of controlling the storage section 25 to record the photographed image.

As described above, the system controller 10 may determine the occurrence of the recording start trigger and then perform the recording start control. This makes it possible to automatically start the recording of the photographed image in a situation where the recording of the photographed image is desirable for the user.

Next, examples of how the occurrence of the recording termination trigger is determined will now be described below.

For example, in the exemplary procedure of FIG. 15, it is detected that it is dark or too bright in the surroundings. The system controller 10 may determine that the recording termination trigger has occurred when it has become neither dark nor too bright in the surroundings, and then proceed to step F116 in FIG. 13 (or step F127 in FIG. 14) to perform the recording termination control of controlling the storage section to terminate the recording of the photographed image.

In the case where the weather is being determined as in the procedure of FIG. 16A, the system controller 10 may determine that the recording termination trigger has occurred based on the weather conditions, and then perform the recording termination control.

In the case where it is determined whether or not it is dark in the surroundings as in the procedure of FIG. 16B, the system controller 10 may determine that the recording termination trigger has occurred when it has become not dark in the surroundings, and then perform the recording termination control.

In the case where it is determined whether the imaging object is far away from or close to the user as in the procedure of FIG. 17, the system controller 10 may determine that the recording termination trigger has occurred when it has been determined that the imaging object is neither far away from nor close to the user, and then perform the recording termination control.

In the case where the image including a letter nearby is detected as in the procedure of FIG. 18, the system controller 10 may determine that the recording termination trigger has occurred when such an image has ceased to be detected, and then perform the recording termination control.

In the case where the time period or the like is determined as in the procedure of FIG. 19, the system controller 10 may determine that the recording termination trigger has occurred based on the time period, the month and day, the season, or the like, and then perform the recording termination control.

The system controller 10 may determine that the recording termination trigger has occurred when the current position has reached the predetermined place as in the procedure of FIG. 20A, and then perform the recording termination control. In this case, it is possible to disable a function of recording the photographed image at the specified place or based on the type of the facility at the current position. For example, an operation of not permitting the recording of the photographed image at a place where the recording of the photographed image is prohibited as in the concert hall, the museum, or the like can be achieved.

In the case where imaging with increased infrared sensitivity is stopped as in the procedure of FIG. 20B, the system controller 10 may determine at step F713 that the recording termination trigger has occurred, and then perform the recording termination control.

The system controller 10 may determine that the recording termination trigger has occurred when it has been determined that the photographed image includes the specified object as in the procedure of FIG. 21A, and then perform the recording termination control. In this case, an operation of prohibiting the recording concerning the specified object can be achieved, for example.

Also the system controller 10 may determine that the recording termination trigger has occurred when it has been determined that the photographed image does not include the specified object, and then perform the recording termination control.

In the case where the quick motion of the imaging object is being detected as in the procedure of FIG. 21B, the system controller 10 may determine that the recording termination trigger has occurred when the quick motion has ceased to be detected, and then perform the recording termination control.

The system controller 10 may determine that the recording termination trigger has occurred when the specified person has been detected as in the procedure of FIG. 22A, and then perform the recording termination control. In this case, an operation of prohibiting recording of the photographed image concerning the specified person can be achieved.

Also, the system controller 10 may determine that the recording termination trigger has occurred when it has been determined that the specified person has ceased to be present in the photographed image, and then perform the recording termination control.

In the case where the distribution of brightness variation in the image is being detected as in the procedure of FIG. 22B, the system controller 10 may determine that the recording termination trigger has occurred when the brightness variations have been eliminated from the imaging object, and then perform the recording termination control.

Also, the system controller 10 may determine that the recording termination trigger has occurred when the brightness variations are present in the image, and then perform the recording termination control.

As described above, the system controller 10 may determine the occurrence of the recording termination trigger and then perform the recording termination control. This makes it possible to automatically terminate the recording operation in the storage section 25 when the necessity of the recording of the photographed image for the user has been reduced or eliminated, or when it is desirable that the recording of the photographed image should be prohibited.

Note that the system controller 10 is not only capable of controlling the start and termination of the recording operation in the storage section 25 based on the recording start trigger and the recording termination trigger, but also capable of performing various other types of control concerning the recording operation in the storage section 25.

Suppose, for example, that when recording of a video stream as the photographed image data is being performed in the storage section 25, the specified object or the specified person has been detected as in the procedure of FIG. 21A or 22A. In this case, the system controller 10 may cause a portion of the video stream including the specified object or the specified person to be marked. That is, the system controller 10 may add metadata as marking information to the video data that includes the specified object or the specified person. This makes it easy to search for video including the specified object or the specified person when the recorded photographed image data (i.e., the video stream) is reproduced subsequently.

Also, in the case where the quick motion of the imaging object has been detected as in the procedure of FIG. 21B, the system controller 10 may change a bit rate or a compression ratio of data to be recorded. Also, the system controller 10 may change the bit rate or the compression ratio of the data to be recorded in accordance with the weather or the time.

Further, it is conceivable that the system controller 10 controls the storage section 25 to record one frame of the photographed image data as still image data. In this case, the system controller 10 may control the storage section 25 to record the one frame of the photographed image data (i.e., the still image data) at a time when the above-described recording start trigger has occurred.

Still further, it is conceivable that the system controller 10 controls the storage section 25 to record data of a video clip, several seconds to several minutes in length, out of the photographed image data. In this case, the system controller 10 may control the storage section 25 to record the video clip at a time when the above-described recording start trigger has occurred, for example.

Needless to say, the photographed image data is not limited to the video stream, but may be a still image as obtained by a digital still camera or the video clip.

Next, examples of how the occurrence of the transmission start trigger is determined will now be described below.

For example, the system controller 10 may determine that the transmission start trigger has occurred when it has been detected via the surrounding environment sensor 19 that it is dark or too bright in the surroundings as in the procedure of FIG. 15, and then proceed to step F115 in FIG. 13 (or step F126 in FIG. 14) to perform the transmission start control of controlling the communication section 26 to start transmitting the photographed image data to the external device.

In the case where the weather is being detected as in the procedure of FIG. 16A, the system controller 10 may determine that the transmission start trigger has occurred based on the weather, and then perform the transmission start control.

The system controller 10 may determine that the transmission start trigger has occurred when it has been determined that it is dark in the surroundings as in the procedure of FIG. 16B, and then perform the transmission start control.

The system controller 10 may determine that the transmission start trigger has occurred when it has been determined that the imaging object is far away from or close to the user as in the procedure of FIG. 17, and then perform the transmission start control.

The system controller 10 may determine that the transmission start trigger has occurred when the image including a letter nearby has been detected as in the procedure of FIG. 18, and then perform the transmission start control.

In addition, in the case where the letter has been detected by the image analysis section 17, the image analysis section 17 may supply the detected letter to the system controller 10 as the text data, and the system controller 10 may transfer the text data to the communication section 26 to be transmitted to the external device. The communication section 26 may either transmit the text data together with the photographed image data or transmit only the text data.

In the case where the time period is determined as in the procedure of FIG. 19, the system controller 10 may determine that the transmission start trigger has occurred based on the time period, and then perform the transmission start control. In this case, an operation of starting the transmission when the current time has reached a specified time period can be achieved. Needless to say, the system controller 10 may determine that the transmission start trigger has occurred based on the month and day, the season, or the like.

The system controller 10 may determine that the transmission start trigger has occurred when the current position has reached the predetermined place as in the procedure of FIG. 20A, and then perform the transmission start control. For example, an operation of starting the transmission when the user is at a place where network transmission is possible, such as a place close to the network access point, can be achieved.

The system controller 10 may determine that the transmission start trigger has occurred when it has been determined that the photographed image includes the specified object as in the procedure of FIG. 21A, and then perform the transmission start control. In this case, an operation of transmitting the photographed image concerning the specified object can be achieved.

The system controller 10 may determine that the transmission start trigger has occurred when the quick motion of the imaging object has been detected as in the procedure of FIG. 21B, and then perform the transmission start control.

The system controller 10 may determine that the transmission start trigger has occurred when the specified person has been detected as in the procedure of FIG. 22A, and then perform the transmission start control. In this case, an operation of transmitting the photographed image concerning the specified person can be achieved.

The system controller 10 may determine that the transmission start trigger has occurred when the brightness variations has been detected in the image as in the procedure of FIG. 22B, and then perform the transmission start control.

Here, one exemplary procedure for determining the occurrence of the transmission start trigger will now be described below with reference to FIG. 23.

Figure 23:
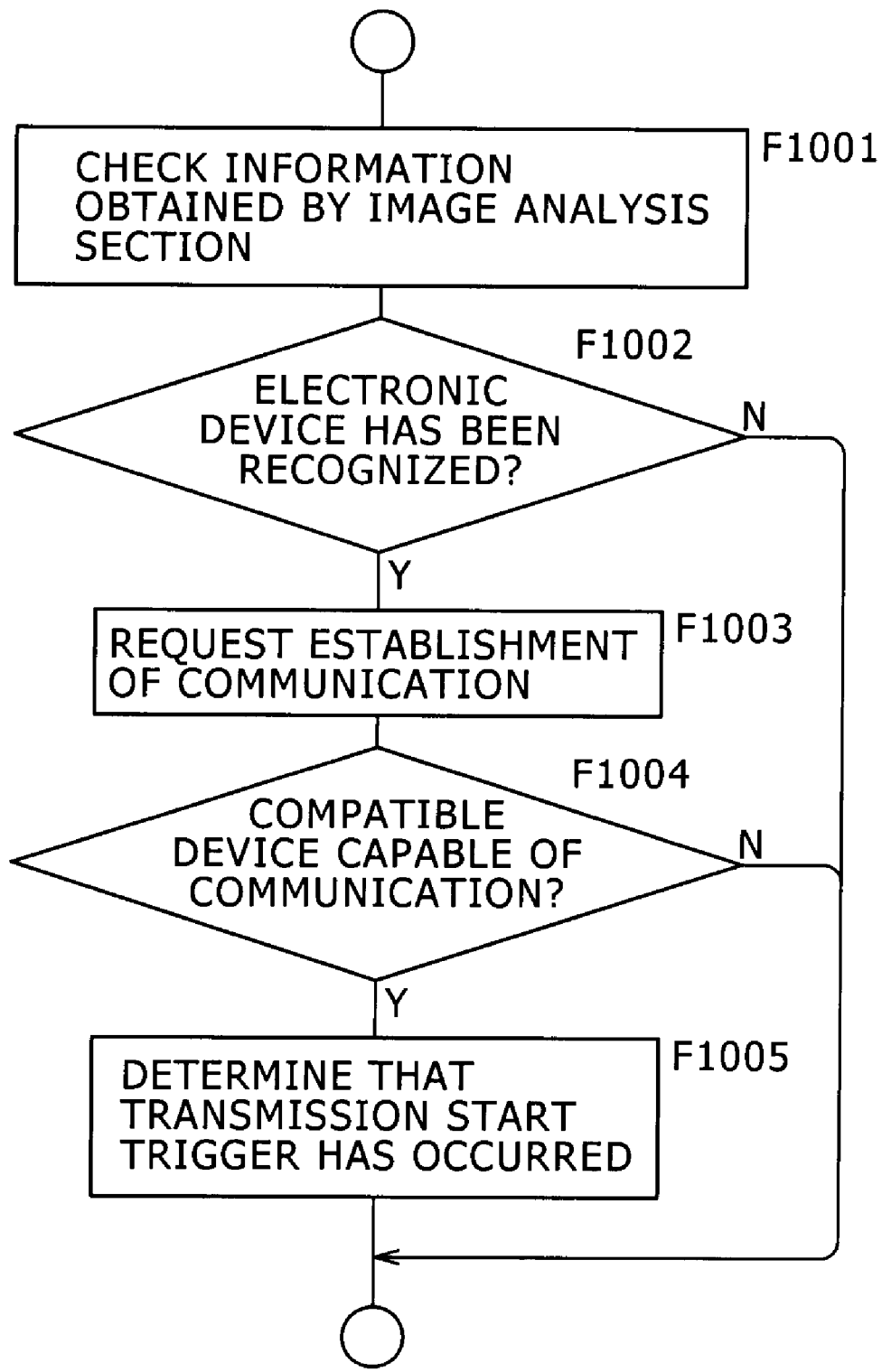
FIG. 23 is a flowchart illustrating a procedure for determining occurrence of a transmission start trigger according to one embodiment of the present invention.

At step F1001 in FIG. 23, the system controller 10 monitors the information obtained from the image analysis section 17. It is assumed here that the image analysis section 17 analyzes the photographed image to detect whether the subject includes an electronic device with which the imaging apparatus 1 (1A) is capable of communicating. For example, a device, such as the personal computer, the mobile phone, the AV equipment, or the PDA, with which the imaging apparatus 1 (1A) may be capable of performing data communication is identified based on its appearance.

When, as a result of the image analysis, it is determined that the electronic device is being photographed, the system controller 10 proceeds from step F1002 to step F1003, and instructs the communication section 26 to transmit to the electronic device a request for establishment of communication. If the electronic device photographed is a device that is capable of communicating with the imaging apparatus 1 (1A) according to the present embodiment, a response to the request for the establishment of communication will be obtained, so that the communication is established between the imaging apparatus 1 (1A) and the electronic device. When it is determined that the external electronic device is a compatible device that is capable of communicating with the imaging apparatus 1 (1A) as described above, the system controller 10 proceeds from step F1004 to step F1005, and determines that the transmission start trigger has occurred.

As a result of it being determined at step F1005 that the transmission start trigger has occurred, the system controller 10 may perform the transmission start control in the procedure of FIG. 13 or 14 so that the transmission of the photographed image data will be started.

Further, the system controller 10 may determine that the transmission start trigger has occurred when the request for the establishment of communication has been received from the external device.

As described above, the system controller 10 may determine the occurrence of the transmission start trigger and then perform the transmission start control. This makes it possible to automatically start the transmission operation in a situation where the user is likely to desire to transmit the image to the external device, or in a situation where transmission is possible, for example.

Next, examples of how the occurrence of the transmission termination trigger is determined will now be described below.

For example, in the exemplary procedure of FIG. 15, it is detected that it is dark or too bright in the surroundings. The system controller 10 may determine that the transmission termination trigger has occurred when it has become neither dark nor too bright in the surroundings, and then proceed to step F116 in FIG. 13 (or step F127 in FIG. 14) to perform the transmission termination control of controlling the communication section 26 to terminate the transmission to the external device.

In the case where the weather is being determined as in the procedure of FIG. 16A, the system controller 10 may determine that the transmission termination trigger has occurred based on the weather conditions, and then perform the transmission termination control.

In the case where it is determined whether or not it is dark in the surroundings as in the procedure of FIG. 16B, the system controller 10 may determine that the transmission termination trigger has occurred when it has become not dark in the surroundings, and then perform the transmission termination control.

In the case where it is determined whether the imaging object is far away from or close to the user as in the procedure of FIG. 17, the system controller 10 may determine that the transmission termination trigger has occurred when it has been determined that the imaging object is neither far away from nor close to the user, and then perform the transmission termination control.

In the case where the image including a letter nearby is detected as in the procedure of FIG. 18, the system controller 10 may determine that the transmission termination trigger has occurred when such an image has ceased to be detected, and then perform the transmission termination control.

In the case where the time period or the like is determined as in the procedure of FIG. 19, the system controller 10 may determine that the transmission termination trigger has occurred based on the time period, the month and day, the season, or the like, and then perform the transmission termination control.

The system controller 10 may determine that the transmission termination trigger has occurred when the current position has reached the predetermined place as in the procedure of FIG. 20A, and then perform the transmission termination control.

In the case where imaging with increased infrared sensitivity is stopped as in the procedure of FIG. 20B, the system controller 10 may determine at step F713 that the transmission termination trigger has occurred, and then perform the transmission termination control.

The system controller 10 may determine that the transmission termination trigger has occurred when it has been determined that the photographed image includes the specified object as in the procedure of FIG. 21A, and then perform the transmission termination control. Also, the system controller 10 may determine that the transmission termination trigger has occurred when it has been determined that the photographed image does not include the specified object, and then perform the transmission termination control.

In the case where the quick motion of the imaging object is being detected as in the procedure of FIG. 21B, the system controller 10 may determine that the transmission termination trigger has occurred when the quick motion has ceased to be detected, and then perform the transmission termination control.

The system controller 10 may determine that the transmission termination trigger has occurred when the specified person has been detected as in the procedure of FIG. 22A, and then perform the transmission termination control. Also, the system controller 10 may determine that the transmission termination trigger has occurred when it has been determined that the specified person has ceased to be present in the photographed image, and then perform the transmission termination control.

In the case where the distribution of brightness variation in the image is being detected as in the procedure of FIG. 22B, the system controller 10 may determine that the transmission termination trigger has occurred when the brightness variations have been eliminated from the imaging object, and then perform the transmission termination control. Also, the system controller 10 may determine that the transmission termination trigger has occurred when the brightness variations are present in the image, and then perform the transmission termination control.

Further, the system controller 10 may determine that the transmission termination trigger has occurred when a request for terminating the communication has been received from the external device or when the communication with the external device has become impossible, and then perform the transmission termination control.

As described above, the system controller 10 may determine the occurrence of the transmission termination trigger and then perform the transmission termination control. This makes it possible to automatically terminate the transmission operation performed by the communication section 26 when the necessity, for the user, of the transmission of the photographed image to the external device has been reduced or eliminated, or when transmission is impossible.

Examples of how the occurrence of the imaging operation control trigger, the imaging start trigger, the imaging termination trigger, the recording start trigger, the recording termination trigger, the transmission start trigger, and the transmission termination trigger are determined have been described above. Note, however, that there are a variety of other manners for determining the occurrence thereof.

6. Effects of Embodiments, Exemplary Variants, and Exemplary Expansions

Embodiments of the present invention have been described above. In the above-described embodiments, concerning the operation of photographing a scene that is in the direction in which the user sees, the operation being performed by the imaging section 3 attached to the spectacle-shaped or head-mounted wearing unit, for example, control is exercised based on the outside world information, so that an appropriate imaging operation suited to the situation is performed without the need for the user to perform any operation. Thus, the scene that is in the direction in which the eyes of the user are directed can be photographed with appropriate timing or in an appropriate mode. Also, an entertaining photographed image can be obtained.

Further, the recording of the photographed image data and/or the audio data in the storage section 25 and the transmission thereof to the external device via the communication section 26 are performed in accordance with the outside world information. This enables a scene within the field of vision of a certain user to be shared by a plurality of people. It also enables the scene within the field of vision of the user to be reproduced for viewing subsequently. That is, it enables the scene that the user who is wearing the imaging apparatus 1 (1A) is viewing to be used in various manners.

In the above-described embodiments, control concerning the imaging operation achieved by the control of the imaging operation performed in the imaging section 3 and the signal processing performed in the imaging signal processing section 15 has primarily been described. Note, however, that switching between power-on, power-off, and standby states, control of signal processing performed in the display image processing section 12, control of the volume or tone of the audio outputted via the audio output section 5, and the like may be performed based on the outside world information. For example, the volume may be controlled in accordance with the level of noise in the outside world, the weather, or the like.

Note that the appearance and structure of the imaging apparatus 1 (1A) are not limited to those illustrated in FIGS. 1 to 4, but that various variants are possible.

For example, the imaging apparatus may include only one of the storage section 25 and the communication section 26. Further, the imaging apparatus may include the monitoring display system without including either the storage section 25 or the communication section 26.

The imaging apparatuses 1 and 1A according to the above-described embodiments have the spectacle-shaped and head-mounted wearing units, respectively. Note, however, that a requirement for the imaging apparatus according to the present invention is to be configured to photograph the scene that is in the direction in which the eyes of the user are directed, and that the wearing unit used for the user to wear the imaging apparatus may be of any type, such as a headphone type, a neckband type, a behind-the-ear type, or the like. Further, the imaging apparatus may be attached to common spectacles, visor, headphone, or the like via a fixing device, such as a clip, so that the imaging apparatus can be worn by the user. Also note that it is not necessary that the imaging apparatus be mounted on the head of the user.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
    an imaging unit configured to record images of a scene;
    an environment information acquisition unit configured to acquire environment information and information of the scene being recorded, the environment information including atmospheric data; and
    a control unit, including a processor, configured to start and terminate a recording of images and to control a plurality of operations of said imaging unit based on both the environment information and information of the scene being recorded,
    wherein the control unit also controls the plurality of operations based on the type of environment information and information of the scene being recorded.

2. The imaging apparatus according to claim 1, further comprising a display unit configured to display the image recorded by said imaging unit.

3. The imaging apparatus according to claim 1, further comprising a recording unit configured to record the images recorded by said imaging unit on a storage medium.

4. The imaging apparatus according to claim 1, further comprising a transmission unit configured to transmit the image recorded by said imaging unit to an external device.

5. The imaging apparatus according to claim 4, wherein said control unit controls said transmission unit to start or terminate transmission based on the environment information and the information of the scene being recorded.

6. The imaging apparatus according to claim 1, wherein said imaging unit includes a CCD sensor or a CMOS sensor as an imaging device.

7. The imaging apparatus according to claim 1, wherein said environment information acquisition unit is a sensor configured to detect a situation of a surrounding environment as the environment information.

8. The imaging apparatus according to claim 1, wherein said environment information acquisition unit is a sensor configured to detect information concerning an imaging object of said imaging unit as the environment information.

9. The imaging apparatus according to claim 1, wherein said environment information acquisition unit acquires current position information as the environment information.

10. The imaging apparatus according to claim 1, wherein said environment information acquisition unit acquires a current date and time as the environment information.

11. The imaging apparatus according to claim 1, wherein said environment information acquisition unit acquires the environment information via communication with an external device.

12. The imaging apparatus according to claim 1, wherein said environment information acquisition unit acquires the environment information and information of the scene being recorded via image analysis performed on the image recorded by said imaging unit.

13. The imaging apparatus according to claim 1, wherein the environment information acquired by said environment information acquisition unit is information of a brightness, temperature, humidity, atmospheric pressure, or weather of surroundings.

14. The imaging apparatus according to claim 1, wherein the information of the scene being recorded includes information of a distance to an imaging object of said imaging unit.

15. The imaging apparatus according to claim 1, wherein the information of the scene being recorded includes information or energy of infrared rays emitted by an imaging object of said imaging unit.

16. The imaging apparatus according to claim 1, wherein the information of the scene being recorded includes information or energy of ultraviolet rays emitted by an imaging object of said imaging unit.

17. The imaging apparatus according to claim 1, wherein the information of the scene being recorded includes information for identifying an imaging object of said imaging unit.

18. The imaging apparatus according to claim 1, wherein the information of the scene being recorded includes information for identifying a person, an animal, a structure, a natural object, or a device as an imaging object of said imaging unit.

19. The imaging apparatus according to claim 1, wherein the information of the scene being recorded includes information of a motion of an imaging object of said imaging unit.

20. The imaging apparatus according to claim 1, wherein the information of the scene being recorded includes information for identifying an individual person as an imaging object of said imaging unit.

21. The imaging apparatus according to claim 1, wherein the information of the scene being recorded includes information for determining whether an imaging object of said imaging unit includes a letter.

22. The imaging apparatus according to claim 1, wherein the information of the scene being recorded includes information of a place corresponding to a current position.

23. The imaging apparatus according to claim 1, wherein the information of the scene being recorded includes information of a structure or a natural object in an area corresponding to a current position.

24. The imaging apparatus according to claim 1, wherein the information of the scene being recorded includes information of brightness or clearness of the image recorded by said imaging unit.

25. The imaging apparatus according to claim 1, wherein the information of the scene being recorded includes information of brightness or clearness of a part of the image recorded by said imaging unit.

26. The imaging apparatus according to claim 1, wherein said control unit controls activation and deactivation of an imaging operation in said imaging unit.

27. The imaging apparatus according to claim 1, wherein said control unit adjusts an angle of view of said imaging unit between telephoto and wide-angle extremes.

28. The imaging apparatus according to claim 1, wherein said control unit adjusts a focus in said imaging unit.

29. The imaging apparatus according to claim 1, wherein said control unit adjusts imaging sensitivity in said imaging unit.

30. The imaging apparatus according to claim 1, wherein said control unit adjusts infrared imaging sensitivity in said imaging unit.

31. The imaging apparatus according to claim 1, wherein said control unit adjusts ultraviolet imaging sensitivity in said imaging unit.

32. The imaging apparatus according to claim 1, wherein said control unit adjusts imaging sensitivity in a part of an imaging device in said imaging unit.

33. The imaging apparatus according to claim 1, wherein said control unit adjusts a frame rate in said imaging unit.

34. The imaging apparatus according to claim 1, wherein said control unit controls an operation of a photographic lens system in said imaging unit.

35. The imaging apparatus according to claim 1, wherein said control unit controls an operation of an imaging signal processing section that processes an imaging signal obtained by an imaging device in said imaging unit.

36. The imaging apparatus according to claim 1, further comprising
an illumination unit configured to provide illumination in the direction in which a user sees,
wherein, based on the environment information and the information of the scene being recorded, said control unit controls an operation of providing illumination performed by said illumination unit.

37. The imaging apparatus according to claim 1, further comprising:
a speech synthesis unit configured to perform speech synthesis based on a letter included in the image recorded by said imaging unit to generate synthesized speech; and
an audio output unit configured to output the synthesized speech generated by said speech synthesis unit,
wherein, based on the environment information and information of the scene being recorded, said control unit controls an operation of outputting the synthesized speech generated by said speech synthesis unit.

38. The imaging apparatus according to claim 1, wherein the control unit:
starts the recording of images, without a user input, when it is determined from the environment information and the information of the scene being recorded that a detected illumination is lower than a first predetermined luminance level; and terminates the recording of images, without the user input, when it is determined from the environment information and the information of the scene being recorded that the detected illumination is higher than a second predetermined luminance level.

39. An imaging method employed by an imaging apparatus that includes an imaging unit configured to record images of a scene, the method comprising the steps of:
- acquiring environment information and information of the scene being recorded of the scene being recorded, the environment information including atmospheric data;
- starting and stopping a recording of images based on the environment information and information of the scene being recorded;
- controlling a plurality of operations of the imaging unit based on both the environment information and information of the scene being recorded; and
- controlling the plurality of operations based on the type of environment information and information of the scene being recorded.

40. An imaging apparatus, comprising:
- imaging means for recording images of a scene;
- environment information acquisition means for acquiring environment information and information of the scene being recorded of the scene being recorded, the environment information including atmospheric data; and
- control means for starting and terminating a recording of images and for controlling a plurality of operations of said imaging means based on both the environment information and information of the scene being recorded,
- wherein the control means also controls the plurality of operations based on the type of environment information and information of the scene being recorded.

* * * * *